(12) United States Patent
Graham et al.

(10) Patent No.: US 7,945,945 B2
(45) Date of Patent: May 17, 2011

(54) SYSTEM AND METHOD FOR ADDRESS BLOCK ENHANCED DYNAMIC NETWORK POLICY MANAGEMENT

(75) Inventors: Richard Graham, Derry, NH (US); John Roese, Newmarket, NH (US)

(73) Assignee: Enterasys Networks, Inc., Andover, MA (US)

( * ) Notice: Subject to any disclaimer, the term of this patent is extended or adjusted under 35 U.S.C. 154(b) by 1066 days.

(21) Appl. No.: 11/199,552

(22) Filed: Aug. 8, 2005

(65) Prior Publication Data

US 2006/0036730 A1    Feb. 16, 2006

Related U.S. Application Data

(63) Continuation-in-part of application No. 11/066,622, filed on Feb. 25, 2005.

(60) Provisional application No. 60/599,626, filed on Aug. 6, 2004.

(51) Int. Cl.
    *H04L 9/32*      (2006.01)
    *H04L 9/00*      (2006.01)
    *G06F 7/04*      (2006.01)

(52) U.S. Cl. .................. 726/3; 726/27; 726/28; 726/29; 726/30; 726/4; 713/151; 713/152; 713/153

(58) Field of Classification Search ........................ 726/3
See application file for complete search history.

(56) References Cited

U.S. PATENT DOCUMENTS

| | | | |
|---|---|---|---|
| 4,627,052 | A | 12/1986 | Hoare et al. |
| 4,734,907 | A | 3/1988 | Turner |
| 4,823,338 | A | 4/1989 | Chan et al. |
| 4,939,726 | A | 7/1990 | Flammer et al. |
| 5,076,688 | A | 12/1991 | Bowen et al. |
| 5,090,025 | A | 2/1992 | Marshall et al. |
| 5,095,480 | A | 3/1992 | Fenner |
| 5,132,926 | A | 7/1992 | MacEachem et al. |
| 5,136,580 | A | 8/1992 | Videlock et al. |
| 5,173,933 | A | 12/1992 | Garner et al. |
| 5,243,652 | A | 9/1993 | Teare et al. |
| 5,289,460 | A | 2/1994 | Drake, Jr. et al. |
| 5,331,637 | A | 7/1994 | Francis et al. |
| 5,355,371 | A | 10/1994 | Auerbach et al. |

(Continued)

FOREIGN PATENT DOCUMENTS

EP      1154624      11/2001

(Continued)

OTHER PUBLICATIONS

"802.1 Plenary Meeting Agenda," IEEE 802.1 Meeting, LaJolla, CA, Mar. 11, 1996.

(Continued)

*Primary Examiner* — Longbit Chai
(74) *Attorney, Agent, or Firm* — Holland & Knight LLP; Brian J. Colandreo, Esq.; J. Mitchell Herbert, Jr. Esq.

(57) ABSTRACT

A method, computer readable medium, and system for acquiring address block information for an attached function that initiates network access on a distributed computing network. Additional policy information in acquired concerning the attached function. One or more access policies are set based, at least in part, on the address block information and the additional policy information.

30 Claims, 3 Drawing Sheets

U.S. PATENT DOCUMENTS

| | | |
|---|---|---|
| 5,355,375 A | 10/1994 | Christensen |
| 5,361,256 A | 11/1994 | Doeringer et al. |
| 5,367,667 A | 11/1994 | Wahlquist |
| 5,394,402 A | 2/1995 | Ross |
| 5,396,493 A | 3/1995 | Sugiyama |
| 5,400,326 A | 3/1995 | Smith |
| 5,428,615 A | 6/1995 | Backes et al. |
| 5,434,855 A | 7/1995 | Perlman et al. |
| 5,442,633 A | 8/1995 | Perkins et al. |
| 5,444,702 A | 8/1995 | Burnett et al. |
| 5,448,565 A | 9/1995 | Chang et al. |
| 5,475,781 A | 12/1995 | Chang et al. |
| 5,481,540 A | 1/1996 | Huang |
| 5,485,455 A | 1/1996 | Dobbins et al. |
| 5,491,694 A | 2/1996 | Oliver et al. |
| 5,500,860 A | 3/1996 | Perlman et al. |
| 5,506,838 A | 4/1996 | Flanagan |
| 5,511,168 A | 4/1996 | Perlman et al. |
| 5,517,494 A | 5/1996 | Green |
| 5,517,620 A | 5/1996 | Hashimoto et al. |
| 5,519,760 A | 5/1996 | Borkowski et al. |
| 5,521,910 A | 5/1996 | Matthews |
| 5,530,703 A | 6/1996 | Liu et al. |
| 5,550,816 A | 8/1996 | Hardwick et al. |
| 5,553,083 A | 9/1996 | Miller |
| 5,583,861 A | 12/1996 | Holden |
| 5,606,602 A | 2/1997 | Coyle et al. |
| 5,608,726 A | 3/1997 | Virgile |
| 5,613,069 A | 3/1997 | Walker |
| 5,621,793 A | 4/1997 | Bednarek et al. |
| 5,634,011 A | 5/1997 | Auerbach et al. |
| 5,640,452 A | 6/1997 | Murphy |
| 5,659,617 A | 8/1997 | Fischer |
| 5,675,582 A | 10/1997 | Hummel et al. |
| 5,684,800 A | 11/1997 | Dobbins et al. |
| 5,727,057 A | 3/1998 | Emery et al. |
| 5,734,865 A | 3/1998 | Yu |
| 5,740,171 A | 4/1998 | Mazzola et al. |
| 5,742,604 A | 4/1998 | Edsall et al. |
| 5,745,685 A | 4/1998 | Kirchner et al. |
| 5,752,003 A | 5/1998 | Hart |
| 5,754,657 A | 5/1998 | Schipper et al. |
| 5,757,916 A | 5/1998 | MacDoran et al. |
| 5,781,726 A | 7/1998 | Pereira |
| 5,781,737 A | 7/1998 | Schmidt |
| 5,790,074 A | 8/1998 | Rangedahl et al. |
| 5,812,819 A | 9/1998 | Rodwin |
| 5,825,772 A | 10/1998 | Dobbins et al. |
| 5,862,338 A | 1/1999 | Walker et al. |
| 5,874,964 A | 2/1999 | Gille |
| 5,881,236 A | 3/1999 | Dickey |
| 5,892,451 A | 4/1999 | May et al. |
| 5,892,910 A | 4/1999 | Safadi |
| 5,892,912 A | 4/1999 | Suzuki et al. |
| 5,898,686 A | 4/1999 | Virgile |
| 5,905,779 A | 5/1999 | Steinmetz |
| 5,920,699 A | 7/1999 | Bare |
| 5,922,073 A | 7/1999 | Shimada |
| 5,963,556 A | 10/1999 | Varghese et al. |
| 5,983,364 A | 11/1999 | Bortcosh |
| 5,999,126 A | 12/1999 | Ito |
| 6,005,864 A | 12/1999 | Krause |
| 6,006,259 A | 12/1999 | Adelman et al. |
| 6,012,088 A | 1/2000 | Li et al. |
| 6,018,771 A | 1/2000 | Hayden |
| 6,035,105 A | 3/2000 | McCloghrie et al. |
| 6,041,166 A | 3/2000 | Hart et al. |
| 6,044,400 A | 3/2000 | Golan et al. |
| 6,061,797 A | 5/2000 | Jade et al. |
| 6,070,079 A | 5/2000 | Kuwahara |
| 6,076,114 A | 6/2000 | Wesley |
| 6,078,957 A | 6/2000 | Adelman et al. |
| 6,085,243 A | 7/2000 | Fletcher et al. |
| 6,094,434 A | 7/2000 | Kotzur et al. |
| 6,105,027 A | 8/2000 | Schneider et al. |
| 6,105,064 A | 8/2000 | Davis et al. |
| 6,108,365 A | 8/2000 | Rubin et al. |
| 6,115,754 A | 9/2000 | Landgren |
| 6,122,664 A | 9/2000 | Boukobza et al. |
| 6,130,890 A | 10/2000 | Leinwand et al. |
| 6,131,120 A | 10/2000 | Reid |
| 6,151,324 A | 11/2000 | Belser et al. |
| 6,151,631 A | 11/2000 | Ansell et al. |
| 6,157,647 A | 12/2000 | Husak |
| 6,167,275 A | 12/2000 | Oros et al. |
| 6,167,513 A | 12/2000 | Inoue et al. |
| 6,192,045 B1 | 2/2001 | Williams |
| 6,192,403 B1 | 2/2001 | Jong et al. |
| 6,201,789 B1 | 3/2001 | Witkowski et al. |
| 6,205,126 B1 | 3/2001 | Moon |
| 6,212,391 B1 | 4/2001 | Saleh et al. |
| 6,216,159 B1 | 4/2001 | Chintakrindi et al. |
| 6,222,840 B1 | 4/2001 | Walker et al. |
| 6,230,018 B1 | 5/2001 | Watters et al. |
| 6,233,242 B1 | 5/2001 | Mayer et al. |
| 6,236,365 B1 | 5/2001 | LeBlanc et al. |
| 6,256,338 B1 | 7/2001 | Jalloul et al. |
| 6,259,404 B1 | 7/2001 | Parl et al. |
| 6,273,622 B1 | 8/2001 | Ben-David |
| 6,286,044 B1 | 9/2001 | Aoyama et al. |
| 6,304,218 B1 | 10/2001 | Sugiura et al. |
| 6,308,273 B1 | 10/2001 | Goertzel et al. |
| 6,317,500 B1 | 11/2001 | Murphy |
| 6,327,474 B1 | 12/2001 | Ruutu et al. |
| 6,327,535 B1 | 12/2001 | Evans et al. |
| 6,343,317 B1 | 1/2002 | Glorikian |
| 6,363,422 B1 | 3/2002 | Hunter et al. |
| 6,370,629 B1 | 4/2002 | Hastings et al. |
| 6,388,618 B1 | 5/2002 | Stilp et al. |
| 6,421,009 B2 | 7/2002 | Suprunov |
| 6,442,394 B1 | 8/2002 | Valentine et al. |
| 6,442,616 B1 | 8/2002 | Inoue et al. |
| 6,453,237 B1 | 9/2002 | Fuchs et al. |
| 6,456,853 B1 | 9/2002 | Arnold |
| 6,460,084 B1 | 10/2002 | Van Horne et al. |
| 6,466,786 B1 | 10/2002 | Wallenius |
| 6,480,495 B1 | 11/2002 | Mauger et al. |
| 6,523,064 B1 | 2/2003 | Akatsu et al. |
| 6,539,229 B1 | 3/2003 | Ali |
| 6,542,813 B1 | 4/2003 | Kovacs |
| 6,556,831 B1 | 4/2003 | Buppelmann |
| 6,577,636 B1 * | 6/2003 | Sang et al. .................. 370/395.7 |
| 6,580,914 B1 | 6/2003 | Smith |
| 6,583,713 B1 | 6/2003 | Bates |
| 6,640,184 B1 | 10/2003 | Rabe |
| 6,640,248 B1 | 10/2003 | Jorgensen |
| 6,665,715 B1 | 12/2003 | Houri |
| 6,701,864 B2 | 3/2004 | Watson et al. |
| 6,716,101 B1 | 4/2004 | Meadows et al. |
| 6,741,863 B1 | 5/2004 | Chiang et al. |
| 6,757,545 B2 | 6/2004 | Nowak et al. |
| 6,757,740 B1 | 6/2004 | Parekh et al. |
| 6,771,639 B1 | 8/2004 | Holden |
| 6,778,818 B1 | 8/2004 | O'Neil |
| 6,795,688 B1 | 9/2004 | Plasson et al. |
| 6,799,049 B1 | 9/2004 | Zellner et al. |
| 6,807,427 B1 | 10/2004 | Sakamoto et al. |
| 6,813,501 B2 | 11/2004 | Kinnunen et al. |
| 6,826,385 B2 | 11/2004 | Kujala |
| 6,826,617 B1 | 11/2004 | Ansell et al. |
| 6,834,195 B2 | 12/2004 | Brandenberg et al. |
| 6,859,791 B1 | 2/2005 | Spagna et al. |
| 6,889,051 B2 | 5/2005 | Ogino et al. |
| 6,889,053 B1 | 5/2005 | Chang et al. |
| 6,920,329 B2 | 7/2005 | Kennedy et al. |
| 6,934,548 B1 | 8/2005 | Gould et al. |
| 6,937,988 B1 | 8/2005 | Hemkumar et al. |
| 6,938,096 B1 | 8/2005 | Greschler et al. |
| 6,983,313 B1 | 1/2006 | Korkea-Aho |
| 6,985,731 B1 | 1/2006 | Johnson et al. |
| 7,010,583 B1 | 3/2006 | Aizono et al. |
| 7,089,264 B1 | 8/2006 | Guido et al. |
| 7,120,449 B1 | 10/2006 | Muhonen et al. |
| 7,136,915 B2 | 11/2006 | Rieger, III |
| 7,139,829 B2 | 11/2006 | O'Toole et al. |
| 7,197,556 B1 | 3/2007 | Short et al. |
| 2001/0022558 A1 | 9/2001 | Karr, Jr. et al. |

| | | | |
|---|---|---|---|
| 2001/0039623 | A1 | 11/2001 | Ishikawa |
| 2002/0010866 | A1 | 1/2002 | McCullough et al. |
| 2002/0016831 | A1 | 2/2002 | Peled et al. |
| 2002/0023010 | A1 | 2/2002 | Rittmaster et al. |
| 2002/0034953 | A1 | 3/2002 | Tricarico |
| 2002/0046073 | A1 | 4/2002 | Indseth et al. |
| 2002/0051540 | A1 | 5/2002 | Glick et al. |
| 2002/0052180 | A1 | 5/2002 | Ravishankar et al. |
| 2002/0062379 | A1 | 5/2002 | Widegren et al. |
| 2002/0063656 | A1 | 5/2002 | Gutowski |
| 2002/0107029 | A1 | 8/2002 | Caughran et al. |
| 2002/0122055 | A1 | 9/2002 | Parupudi et al. |
| 2002/0138632 | A1 | 9/2002 | Bade et al. |
| 2002/0164996 | A1 | 11/2002 | Dorenbosch |
| 2002/0188842 | A1 | 12/2002 | Willeby |
| 2003/0035544 | A1 | 2/2003 | Herle et al. |
| 2003/0041167 | A1 | 2/2003 | French et al. |
| 2003/0065571 | A1 | 4/2003 | Dutta |
| 2003/0095509 | A1 | 5/2003 | Ramanan et al. |
| 2003/0107590 | A1* | 6/2003 | Levillain et al. .............. 345/736 |
| 2003/0185233 | A1 | 10/2003 | Ji et al. |
| 2003/0208523 | A1 | 11/2003 | Gopalan et al. |
| 2004/0064334 | A1 | 4/2004 | Nye |
| 2005/0199792 | A1 | 9/2005 | Argast et al. |

FOREIGN PATENT DOCUMENTS

| | | |
|---|---|---|
| WO | 94/28683 | 12/1994 |
| WO | 97/05749 | 2/1997 |
| WO | 97/41654 | 11/1997 |
| WO | 98/19482 | 5/1998 |
| WO | 00/22862 | 4/2000 |
| WO | 00/44149 | 7/2000 |
| WO | 00/67450 | 11/2000 |
| WO | 00/69198 | 11/2000 |
| WO | 01/08425 | 2/2001 |
| WO | 01/22656 | 3/2001 |
| WO | 01/69956 | 9/2001 |
| WO | 01/76093 | 10/2001 |
| WO | 01/82259 | 11/2001 |
| WO | 01/94967 | 12/2001 |
| WO | 01/95505 | 12/2001 |
| WO | 02/09456 | 1/2002 |
| WO | 02/12914 | 2/2002 |

OTHER PUBLICATIONS

"802.1 Resolution on Progess of VLAN work," Jul. 1995, IEEE.
"802.1Thursday Agenda," IEEE 802.1 Meeting, University of Twente, Enschede, Netherlands, Jul. 11, 1996.
"Attachments Passed by Working Group 802.1," IEEE 802.1, Nov. 1995.
"Clearpoint Demonstrates Frame Relay Support in Interop Frame Relay Solutions Showcase," Clearpoint, Press Release dated Sep. 23, 1991.
"Closing Plenary Minutes," IEEE 802.1 Meeting, LaJolla, CA, Mar. 14, 1996.
"Constellation Product Schedule," Apr. 22, 1992.
"Cyberlocator: A new Dimension in Network Security," retrieved from www.cyberlocator.com, Jul. 2002.
"End Station Tagging Presentation," Presentation Jun. 1996.
"Geographic Location/Privacy (geopriv)" retrieved from www.ietf.org, Jul. 2002.
"Geolocation Service Allows Web Sites to Identify Users' Geographic Locations," Business Geographics, May 2001.
"IEEE 802.1 1995 Document Register," IEEE, 1995.
"IEEE 802.1 Session Notes," IEEE 802.1 Meeting, Jul. 8, 1996 through Jul. 11, 1996.
"IEEE 802.1 Working Group, Minutes of the Mar. 1995 Meeting," West Palm Beach Florida, Mar. 1995.
"IEEE Standards for Local and Metropolitan Area Networks: Media Access Control (MAC) Bridges," IEEE, Technical Committee on Computer Communications of the IEEE Computer Society, Mar. 8, 1991, pp. 1-176.
"IEEE Standards for Local and Metropolitan Area Networks: Overview and Architecture," IEEE, Technical Committee on Computer Communications of the IEEE Computer Society, Dec. 21, 1990, pp. 1-31.
"Instructions to the Editor for P802.1j, and Ballot Summary," Jul. 12, 1995, P802.1-95/008, IEEE.
"Instructions to the Editor for the revision of Overview and Architecture," Jul. 12, 1995, P802.1-95/007, IEEE.
"Internet Protocol," DARPA Internet Program Protocol Specification: RFC 791, Sep. 1981, pp. 1-45.
"IP Multicast Streamlines Delivery of Multicast Applications," The Packet: Cisco Systems Use Magazine, V.7, No. 1, 1995.
"LAN Emulation over ATM Version 1.0," The ATM Forum Technical Committee, af-Iane-0021.000, Jan. 1995, pp. 1-141.
"Location Pattern Matching & The RadioCamera Network," US Wireless 2001.
"Location Technologies for GSM, GPRS and WCDMA Networks," SnapTrack, White Paper, Nov. 2001.
"Multiprotocol Routing—From Constellation," Clearpoint Research Corporation, 1992.
"New Cisco IOS VLAN Services Make 'Virtual' a Reality," Cisco VLAN Roadmap, Dec. 9, 1996.
"Newbury Networks Debuts First Location-Enabled Networks Solutions for 802.11B WLANS," retrieved from www.newburynetworks.com/newsroom.presslist.php?start=5, Sep. 2001.
"Proposed comments on ISO/IEC 10038/PDAM 2," Jul. 12, 1995, P802.1-95/009, IEEE.
"Proposed Comments on ISO/IEC 15802-5/PDAM 1," Jul.-Dec. 1995, P802.1-95/010, IEEE.
"Quick VLAN Standardization," IEEE 802.1 Meeting, Ottowa, Oct. 2, 1996.
"Real Time Location Systems and Wireless Local Area Networking: Combining Technologies for Optimum Asset Visibility and Supply Chain Management," Apr. 2001.
"Reliacast to Offer Enhanced Geographic Content Distribution Management Through Partnership with Quova," Mar. 6, 2001.
"Slithernet: A Proposal for Using Moderate-To-High-Speed Synchronous Serial Connections as a LAN-like Networking Medium", Jul. 1991.
"SpotON: Ad-hoc Location Sensing," retrieved from www.portolano.cs.washington.edu/projects/spoton, Jul. 2002.
"TCP-IP Distribution List for Nov. 1991," The Security Digest Archives, Nov. 1991.
"The Richochet Wireless Network Overview," retrieved from http://www.ricochet.net/ricochet/, 1997.
"Virtual LAN Communications," Cisco VLAN Roadmap—White Paper, Dec. 9, 1996.
"Virtual LANs Find a Use for Selective Flooding," Network World, Apr. 10, 1995, V.12, No. 15, p. 54.
"Virtual LANs Get Real," Data Communications, Feb. 1995, pp. 87-96.
"Virtual LANs Near Reality," Data Communications, Jul. 1995, p. 16.
"VisualRoute—Visual Traceroute Utility/Locate Internet Abusers," retrieved from www.visualware.com/visualroute/index/html, Jul. 2002.
Aggarwal, Sudhir, and Raghav, Amritansh, "Dualcast: A Scheme for Reliable Multicasting," IEEE, Apr. 1994, pp. 15-22.
Aguilar, Lorenzo, "Datagram Routing for Internet Multicasting," ACM, 1994, pp. 58-63.
Ahmadi, Hamid, and Denzel, Wolfgang E., "A Survey of Modern High-Performance Switching Techniques," IEEE Journal on Selected Areas in Communications, V.7, No. 7, Sep. 1989, pp. 1091-1103.
Aiello, Rosario, et al., "Casual Ordering in Reliable Group Communications," ACM SIGCOMM, 1993, pp. 106-115.
Almquist, P., and Kastenholz, F., "Towards Requirements for IP Routers," Network Working Group RFC 1716 Memo, Nov. 1994, pp. 1-172.
Alonge, Ken, "Revision to SDE," Email dated Nov. 13, 1995.
Amir and Balakrishnan, "An Evaluation of the Metricom Richochet Wireless Network," U.C. Berkeley, May 1996.
Anderson, Jens Kristian, "Virtual LANs Take Network to Next Level," Computer Technology Review, Sep. 1996, pp. 12-14.
Armstrong, S., et al., "Multicast Transport Protocol," Network Working Group—RFC 1301 Memo, Feb. 1992, pp. 1-36.

Autolitano, A., et al., "Application of Generalized Parallel Delta Networks to a Hybrid Broadband Switch," IEEE 1989, pp. 123-127.
Axner, David H., "Differing Approaches to Virtual LANs," Business Communications Review, V. 23, No. 12, Dec. 1993, pp. 42-45.
Backes, Floyd, "An Architectural Framework for VLAN Standardization in IEEE 802," IEEE Presentation, Milpitas, CA, Jan. 24, 1996.
Backes, Floyd, "Spanning Tree Bridges; Transparent Bridges for Interconnection of IEEE 802 LANs," IEEE Network, V.2, No. 1, Jan. 1988, pp. 5-9.
Bagwell, Richard T., et al., "A Comparison of Native ATM-Multicast to IP-Multicast With Emphasis on Mapping Between the Two," IEEE, 1995, pp. 189-193.
Bahl and Padmanabhan, "RADAR: An In-Building RF-based User Location and Tracking System," Proc. IEE Infocom 2000, Mar. 2000.
Bahl, Padmanabhan, and Balachandran, "A Software System for Locating Mobile Users: Design, Evaluation, and Lessons," Apr. 2000.
Bahl, Padmanabhan, and Balachandran, "Enhancements to the RADAR User Location and Tracking System," Microsoft Research Technical Report, MSR-TR-2000-12, Feb. 2000.
Balboni, Gian Paolo, et al., "An ATM Switching Testbed," Jul.-Aug. 1991.
Ballardie, Tony, et al., "Multicast-Specific Security Threats and Counter Measures," IEEE 1995, pp. 2-16.
Ballardie, Tony, et al., "Core Based Trees (CBT)—An Architecture for Scalable Inter-Domain Multicast Routing," ACM SIGCOMM, 1993, pp. 85-95.
Bament, Sally, "Why You Should Consider INPs as a Viable Internetworking Solution," Telecommunications, V.27, No. 2, Feb. 1993, pp. 54-57.
Bartlett, John, "Embedded VLAN Tagging," IEEE 802.1 Meeting Presentation, LaJolla, CA, Mar. 12, 1996.
Bartlett, John, "Media or Network Based VLANs?," IEEE 802.1 VLAN Meeting Presentation, LaJolla, CA, Mar. 12, 1996.
Barton and Kindberg, "The Challenges and Opportunities of Integrating the Physical World and Networked Systems," Hewlett Packard Laboratories, HPL-2001-18, Jan. 24, 2001.
Bennett, Geoff, "Routing in the Virtual LAN," Telecommunications, V. 29, No. 7, Jul. 1995, pp. 33, 69-72.
Bernabei, Francisco, et al., "A Fully Distributed Routing Control Scheme in an ATM Switch," IEEE, 1990, pp. 766-770.
Birman, Ken, "A Response to Cheriton's and Skeen's Criticism of Causal and Totally Ordered Communication," Department of Computer Science, Cornell University, Oct. 21, 1993, pp. 11-21.
Birman, Kenneth P., and Joseph, Thomas A., "Reliable Communication in the Presence of Failures," ACM Transactions on Computer Systems, V.5, No. 1, Feb. 1987, pp. 47-76.
Birman, Kenneth, et al., "Design Alternatives for Process Group Membership and Multicast," NTIS, Department of Computer Science—Cornell University, Dec. 1991, pp. 1-31.
Blazevic et al., "Self-Organization in Mobile Ad-Hoc Networks: The Approach of Terminodes," IEEE Comm. Mag. 2001.
Boggs, David Reed, "Internet Broadcasting," Dissertation—Stanford University Graduate Studies, University Microfilms International, Jan. 1982, pp. 1-86.
Bolot, Jean-Chrysostome, et al. "Scalable Feedback Control for Multicast Video Distribution in the Internet," ACM SIGCOMM, 1994, pp. 58-67.
Braden, R., "TCP Extensions for High Performance: An Update," Jun. 21, 1993.
Braden, R., and Postel, J., "RFC 1009—Requirements for Internet Gateways," Jun. 1987, pp. 1-55.
Braden, Robert, "Requirements for Internet Hosts—Communication Layers," Internet Engineering Task Force—RFC 1122, Oct. 1989, pp. 1-115.
Brakmo et al., "TCP Vegas: New Technologies for Congestion Detection and Avoidance," Dept. of Computer Science, University of Arizona, Tucson, AZ, 1996.
Braudes, R., and Zabele, S., "Requirements for Multicast Protocols," Network Working Group RFC 1458 Memo, May 1993, pp. 1-18.
Bulusu, Heidermann and Estrin, "GPS-less Low Cost Outdoor Localization for Very Small Devices," Univ. S. California, Apr. 2000.
Bunn, J.J., "Trip Report: DECworld," unpublished, May 18, 1992, pp. 1-11.
Caffery and Stuber, "Overview of Radiolocation in CDMA Cellular Systems," IEEE Communications Magazine, Apr. 1998, pp. 38-45.
Caffery and Stuber, "Subscriber Location in CDMA Cellular Networks," IEEE Trans Veh. Tech. vol. 47, May 1997.
Casner, Steve, "Frequently Asked Questions (FAQ) on the Multicast Backbone (MBONE)," Memo dated Dec. 22, 1994.
Catlin, Jeff, "VLAN," Email dated Nov. 22, 1995.
Challenges for Mesh Networks in UWB Application, UWB Insider 2004 [retrieved Dec. 1, 2006] from the Internet: <URL: www.uwbinsider.com/technology/print/1_8_mesh_challenges.html>.
Chambers, Alan M. "IP mulicast, Floy Backes's Presentation, Denver," Email date Nov. 1, 1995.
Chambers, Alan M. "Re: VLAN Ad Hoc Group," Email date Jun. 14, 1995.
Chambers, Alan, "Mapping the Problem Space," Jul. 9, 1996.
Chan, Cheung-Win, and Yum, Tak-Shing, "An Alogrithm for Detecting and Resolving Store-and-Forward Deadlocks in Packet-Switched Networks," IEEE Transaction on Communications, V.Com-35, No. 8, Aug. 1987, 801-807.
Chen and Lin, "Route Optimization and Location Updates for Mobile Hosts," 16th IEEE Int. Conf. on Dist. Comp. Sys., May 1996.
Chen, Helen, et al., "Evaluation of DEC's Gigaswitch for Distributed Parallel Computing," Supersedes-SAND93-8013, Oct. 1993.
Chen, Xing, and Hayes, Jeremiah F., "Access Control in Multicast Packet Switching," IEEE/ACM Transactions on Networking, V.1, No. 6, Dec. 1993, pp. 638-649.
Cheriton, David R. "Virtual LAN Management Protocol (VLMP) Draft RFC," Stanford University and Granite Systems, Inc., Oct. 20, 1995.
Cheriton, David R., and Deering, Stephen E., "Host Groups: A Multicast Extension for Datagram Internetworks," Proceedings Ninth Data Computer Symposium, Semptember 10-13, 1985, pp. 172-179.
Cheriton, David R., and Williamson, Carey L., "VMTP as the Transport Layer for High-Performance Distributed Systems," IEEE Communications Magazine, Jun. 1989, pp. 37-44.
Cheriton, David R., and Zwaenepoel, Willy, "Distributed Process Groups in the V Kernel," ACM Transactions on Computer Systems, V.3, No. 2, May 1985, pp. 77-107.
Cheriton, David R., et al., "Ethernet Group Membership Protocol (EGMP) Draft RFC," Stanford Univeristy and Granite Systems, Oct. 12, 1995.
Cisco VPN Routers, Cisco Systems, Inc. (1992-20001).
Cisco VPN Solutions, Cisco Systems, Inc. (2001).
Cohen, Jodi, "Critics Take Issue With Fuzzy VLAN Standards Work," Network World, Oct. 30, 1995, V.12, No. 44, pp. 1, 84.
Cohen, Jodi, "Opposing Virtual LAN Views," Network World, Oct. 28, 1996, V.13, No. 44, p. 75.
Cohen, Jodi, "The Truth About Virtual LANs," Network World, Oct. 28, 1996, V.13, No. 44, pp. 1,74.
Cohen, Jodi, "Too Small for VLANs," Network World, Nov. 4, 1996, V.13, No. 45, p. 31.
Conner, Krishnamurthy and Want, "Making Everyday Life Easier Using Dense Sensor Networks," Springer, 2001.
Connery, Glenn, "Re: VLAN Questions/Suggestions," Email dated May 6, 1996.
Corson and Macker, "Mobile As hoc Networking (MANET): Routing Protocal Performance Issues and Evaluation Considerations," Jan. 1999.
Cullerot, David, "Requirements for VLANs," 802.1 Interim Meeting, Oct. 1995, Cabletron Systems, Inc.
Cullerot, David, "Virtual LAN Topology," 802.1 Interim Meeting, Oct. 13, 1995, Cabletron Systems, Inc.
Cullerot, David, "VLAN Topology", 802.1 Interim Meeting, Oct. 13, 1995, Cabletron Systems, Inc.
Daviel, Internet Draft entitled, "Geographic Extensions for HTTP transactions," Apr. 2001.
Davis et al., "A Means for Expressing Location Information in the Domain Name System," Jan. 1996.

De Zhong, Wen, et al., "A Copy Network with Shared Buffers for Large-Scale Multicast ATM Switching," IEEE/ ACM Transactions on Networking, V.1, No. 2, Apr. 1993, pp. 157-165.
Deering, S., "RFC 1112—Host Extensions for IP Multicasting," Aug. 1989.
Deering, S., and Hinden, R., "RFC 2460—Internet Protocol, Version 6 (IPv6) Specification," RFC Archive, Dec. 1998 pp. 1-40.
Deering, S.E., "Host Extensions for IP Multicasting," Network Working Group—RFC 988 Memo, Jul. 1986, pp. 1-20.
Deering, Stephen E., "Multicast Routing in Internetworks and Extended LANs," SIGCOMM 88 Symposium, Communications, Architectures & Protocols, Stanford, CA, Aug. 16-19, 1988, pp. 55-64.
Deering, Stephen E., and Cheriton, David R., "Multicast Routing in Datagram Internetworks and Extended LANs," ACM Transactions on Computer Systems, V.8, No. 2, May 1990, pp. 85-110.
Deering, Stephen Edward, "Multicast Routing in a Datagram Internetwork," UMI Dissertation Services, Dec. 1991, pp. 1-137.
Deering, Stephen, et al., "An Architecture for Wide-Area Multicast Routing," ACM, Apr. 1994, pp. 126-134.
Denning et al. "Location-Based Authentication: Grounding Cyberspace for Better Security," 1996, Elsevier Science Ltd., pp. 1-6.
Derby, et al., "Scoping Multicasts in WAN Interconnected Local Networks," IBM Technical Disclosure Bulletin, Jan. 1992.
Drane, MacNaughton, and Scott, "Positioning GSM Telephones," IEEE Communications Magazine, Apr. 1998.
Duffy, Jim, "Routers' Role Changes as Both Switches, VLANs Come Into Play," Network World, Jun. 3, 1996, V.13, No. 23, p. 22.
Eriksson, Hans, "MBONE: The Multicast Backbone," Communications of the ACM, V.37, No. 8, Aug. 1994, pp. 54-60.
Erramilli, A., and Singh, R.P., "A Reliable and Efficient Multicast Protocol for Broadband Broadcast Networks," ACM, 1988, pp. 343-353.
Estrin, Deborah, and Wei, Liming, "Multicast Routing in Dense and Sparse Modes: Simulation Study of Tradeoffs and Dynamics," IEEE, Jul. 1995, pp. 150-157.
Fall et al., "Comparison of Tahoe, Reno, and Sack TCP," Lawrence Berkeley National Laboratory, Berkeley, CA, Dec. 2, 1995.
Feldmann, et al., "NetScope: Traffic Engineering for IP Networks," IEEE Network Mag. 2000.
Feltman, Charles, "A Reality Check on Virtual LANs," Business Communications Review, V.26, No. 7, Jul. 1996, p. 27.
Finn, Norman W., "External and Internal Addresses in Explicit Tags," Email dated Jan. 25, 1996.
Finn, Norman W., "Implicit vs. Explicit VLAN Frame Tagging," Email dated Jan. 25, 1996.
Finn, Norman W., "Re: 802.1 Interim Meeting—VLANs—Ojectives, Contributions, Agenda," Email dated May 17, 1996.
Finn, Norman W., "Re: VLAN Questions/Suggestions," Email dated May 8, 1996.
Finn, Norman W., "Re: VLANs and IP Multicast," Email dated May 9, 1996.
Finn, Norman W., "Slides for External and Internal Addresses in Explicit Tags," Email dated Jan. 25, 1996.
Finn, Norman W., "Slides for Implicit vs. Explicit VLAN Frame Tagging," Email dated Jan. 25, 1996.
Finn, Norman W., "Two Models for VLAN Tagging," Email dated Mar. 8, 1996.
Finn, Norman, "Multiple Spanning Trees in 802.1Q," IEEE 802.1 Presentation, Sep. 26, 1996, pp. 1-11.
Floyd et al., "Increasing TCP's Initial Window," Jul. 1997.
Floyd, S., "Issues of TCP with SACK," Mar. 9, 1996.
Floyd, S., "TCP and Successive Fast Retransmits," Lawrence Berkeley Laboratory, Berkeley, CA May 1995.
Frantz, Paul, "Re: Re: Revision to SDE," Email dated Nov. 24, 1995.
Frantz, Paul, et al., "Proposed VLAN Service Definition," IEEE 802.1 Presentation, Denver, Oct. 13, 1995.
Gabber and Wool, "On Location-Restricted Services," IEEE Network, Nov./Dec. 1999.
Garcia-Molina, Hector, and Spauster, Annemarie, "Ordered and Reliable Multicast Communication," ACM Transaction on Computer Systems, V.9, No. 3, Aug. 1991, pp. 242-271.
Gessler and Jesse, "Advanced Location Modeling to Enable Sophisticated LBS Providing in 3G Networks," retrieved from www.teco.edu/locationws/9.pdf, Jul. 2002.
Gopal, Inder, and Rom, Raphi, "Multicasting to Multiple Groups over Broadcast Channels," IEEE, 1988, pp. 79-81.
Greenfield, David, "A Realistic Approach to Virtual LANs," Data Communications, Feb. 1996, V.25, No. 2, pp. 50, 52.
Hain, T., Internet Drafts entitled "An IPv6 Provider-Independent Global Unicast Address Format," and "Application and Use of the IPv6 Provider Independent Global Unicast Format," Oct. 2001.
Hanks, S., "Generic Routing Encapsulation (GRE)," Oct. 1994.
Harris & Jeffries, Inc., "A Proposal for Software Development—for an IP-Router Facility," Proposal # 910214.01, Feb. 19, 1991.
Harris, B., "Amulet: Approximate Mobile User Location Tracking System," Retrieved from www.winlab.rutgers.edu/~sachin/papers/papers.html, Jul. 2002.
Hart, John and Backes, Floyd, "IEEE 802 Virtual LANs (VLANs), Proposed Definition and Requirements," dated Jul. 10, 1995.
Hart, John, "Re: Re: Revision to SDE," Email dated Nov. 25, 1995.
Hausman, Richard and Ruby, Doug, "Application Requirements for Support of Duplicate Addresses in VLANs," Contribution to IEEE 802.1Q, Vancouver Plenary, Nov. 11, 1996.
Hausman, Richard, "Re: 802.1Q VLAN PAR Backwards Interoperability," Email dated Jun. 24, 1996.
Hawe, Bill, et al., "Transparent Interconnection of Local Area Networks with Bridges," Journal of Telecommunication Networks, V.3, No. 2, pp. 139-152.
Heidemann, J., "Using Geospatial Information in Sensor Networks," USC/Information Sciences Institute, Sep. 17, 2001.
Heywood, Drew, et al., "Enterprise Series Connectivity: Local Area Networks," 1992, pp. 327-353.
Hightower and Borriello, "A Survey and Taxonomy of Location Systems for Ubiquitous Computing," University of Washington Technical Report, UW-CSE 01-08-03, Aug. 24, 2001.
Hightower, Borriello, and Want, "SpotON: An indoor 3D Location Sensing Technology Based on RF Signal Strength,"University of Wisconsin CSE Technical Report #2000-02-02, Feb. 18, 2000.
Horowitz, Steve, "Priority Bits & First on the Wire Question," Email dated Jun. 25, 1996.
Horowitz, Steve, "Priority Bits Discussion," Email dated Jun. 7, 1996.
Horowitz, Steve, "VLAN Issues List," Email dated Jun. 7, 1996.
Housley, Russ, "Use of SDE to within VLAN Standard," Email dated Jan. 23, 1996.
Ideal Congestion Control, Sep. 1997.
Imielinski and Navas, "GPS-Based Addressing and Routing," Nov. 1996.
Interior Gateway Routing Protocol, Cisco Systems, Inc. (1999).
IP Sec, Cisco Systems, Inc. (1998).
Jacobson, V., "Design Changes to the Kernel Network Architecture for 4.4BSD," Lawrence Berkeley Laboratory, Berkeley, CA May 1992.
Jacobson, V., "Dynamic Congestion Avoidance/Control," email message, Feb. 1988.
Jacobson, V., "End2End," email message, Mar. 1994.
Jacobson, V., "Modified TCP Congestion Avoidance Algorith," email message, Apr. 1990.
Jacobson, V., "Re: Interpacket arrival variance and mean," email message, Jun. 15, 1987.
Jacobson, V., "Re: your congestion scheme," email message, Nov. 1987.
Jacobson, V., "Some Design Issues for High-Speed Networks," Lawrence Berkeley Laboratory, Berkeley, CA Nov. 1993.
Jacobson, V., "TCP Extensions for High Performance," email message, Feb. 1997.
Jacobson, V., "TCP Extensions for Long-Delay Paths," Oct. 1988.
Jeffree, Tony, "Brief Minutes of 802.1—Maui, Jul. 1995," IEEE 802.1 Maui, Jul. 1995.
Jeffree, Tony, "Input paper for July Meeting—Proposed changes to 802.1D Section 3," Email dated Jun. 22, 1995.
Jeffree, Tony, "Proposed Use of GARP for Distribution of VLAN Membership Information," Oct. 28, 1996.
Jeffree, Tony, "Re: Re: Revision to SDE," Email dated Nov. 24, 1995.

Jeffree, Tony, "Re: VLAN Questions/Suggestions," Email dated May 7, 1996.

Jia, Xiaohua, and So, Shirley Y., "A Multicast Mechanism with Ordering on Overlapping Groups," IEEE, 1993, pp. 242-249.

Jing, Hsu Wen, "Multicasting on Certain Self-Similar Networks," Division of Computer Technology—School of Applied Science—Nanyang Technological University, Singapore.

Joe Francica, "Location-based Services: Where Wireless Meets GIS," retrieved from www.geoplace.com, Jul. 2002.

Karagiannis and Heijeck, "Mobile IP: A State of the Art Report," Ericsson Open Report, Jul. 13, 1999.

Keen, Hal, "Comment on P802.1p/D0," Email dated Oct. 30, 1995.

Kindberg and Barton, "The Cooltown User Experience," Hewlett Packard Laboratories, HPL-2001-22, Feb. 2, 2001.

King, Steven S., "It's an Adventure," Network World, Apr. 10, 1995, pp. 49, 54-55.

King, Steven S., "Switched Virtual Networks—Internetworking Moves Beyond Bridges and Routers," Data Communications, Sep. 1994, pp. 66-80.

King, Steven S., "VLANS Raise Delicate Design Issues," Network World, Apr. 17, 1995, V.12, No. 16, pp. 42-43.

King, Steven, "The Many Faces of Virtual LANs," Network World, Mar. 27, 1995, V.12, No. 13, pp. 59-65.

Klamm, Keith, "Dancing Bears in Readable Text Format," Email dated Mar. 8, 1996.

Knight, Fred S., "Broadband Future Faces Snarls and Gnarls," Business Communications Review, V. 23, No. 12, Dec. 1993, p. 6.

Kompella, Vachaspathi, et al., "Multicast Routing for Multimedia Communication," IEEE/ACM Transactions on Networking, V.1, No. 3, Jun. 1993, pp. 286-292.

Kompella, Vachaspathi, et al., "Multicast for Multimedia Applications," Department of Computer Science and Engineering—University of CA, San Diego.

Korkea-Aho and Tang, Internet Drraft (May 2001) entitled "Spactial Location Playload," May 2001.

Langille, Paul, "Partitioning of VLAN Tasks," Email dated Nov. 16, 1995.

Langille, Paul, "Re: Revision to SDE," Email dated Nov. 22, 1995.

Langille, Paul, "Re: . . . Re: Revision to SDE," Email dated Nov. 29, 1995.

Lawson, Stephen, "3Com Unveils a Single Solution for Virtual LANs," InfoWorld, May 13, 1996, V.18, No. 20, p. 59.

Lawson, Stephen, "Cabletron Buys Netlink to Fill Out Frame Relay," InfoWorld, Oct. 7, 1996, V.18, No. 41, p. 51.

Lewis, Bob, "Do VLANs Solve Any Real Problems? Lots of People Seem to Think So," InfoWorld, Jun. 17, 1996, V.18, No. 25, p. 91.

Li et al, "A Scalable Location Service for Geographic Ad Hoc Routing," Proceedings of the ACM MOBICOM 2000 Conference.

Liao, Tseng, and Sheu, "GRID: A Fully Location-Aware Routing Protocol for Mobile As Hoc Networks," Telecommunications Systesm, 2001.

Lidinske, Bill, "802.1 Minutes and Document Plan," Mar. 8, 1995.

Lidinsky, Bill "Re: VLAN Ad Hoc Group," Email dated Jun. 12, 1995.

Lidinsky, Bill, "802.1Q Draft PAR," Email dated Dec. 19, 1995.

Lidinsky, Bill, "8021. Interim Mtg VLAN Agenda," Email dated Oct. 1995.

Lidinsky, Bill "IEEE 802 Overall Agenda—Jul. 1996," Email dated Jun. 23, 1996.

Lidinsky, Bill, "RE: 802.?q," Email dated Jun. 21, 1996.

Lidinsky, Bill, "RE: VLAN use of SDE," Email dated Oct. 2, 1995.

Lidinsky, Bill "VLAN use of SDE," Email dated Oct. 1, 1995.

Lindmeyr, Johann, "VLAN Tagging and Classification," Email dated Nov. 30, 1995.

Lippis, Nick, "Virtual LANs: Real Drawbacks," Data Communications, Dec. 1994, pp. 23-24.

MacLeod, Brian, "1Gbps Ethernet" Email dated Oct. 9, 1995.

Marasli et al., "Partially Reliable Transport Service," Proceedings 2nd IEEE Symp. On Comp. and Comm. (Cat. No. 97TB100137), Proceedings Second IEEE Symposium on Computer and Commmunications, Alexandria, Egypt, Jul. 1-3, 1997, pp. 648-656, XP002131820.

Marasli et al., "Retransmission-Based Partially Reliable Transport Service: An Analytic Model," Proceedings of Infocom, US, Los Alamitos, IEEE Comp. Soc. Press, vol. Conf. 15, 1996, pp. 621-629, XP000621327 (ISBN: 0-8186-7293-5).

Markowsky, George, and Moss, Franklin H., "An Evaluation of Local Path ID Swapping in Computer Networks," IEEE Transactions on Communications, V.Com-29, No. 3, Mar. 1981, pp. 329-336.

Martillo, Joachim, "Re: InterOp Debate," Email thread dated Nov. 6, 1991.

Martillo, Joachim, "Using Wide-Area Point-to-Point Links for Computer Networking," Email thread dated Sep. 1, 1991.

Martillo, Yakim, "Re: Ethernet Multicast," Archived Emails.

Mathis et al., "Forward Acknowledgement: Refining TCP Congestion Control," Pittsburgh Supercomputing Center.

Mathis et al., "TCP Rate-Halving with Bounding Parameters," Pittsburgh Supercomputing Center, Oct. 1996.

Mathis et al., "TCP Selective Acknowledgement options," email message, Oct. 1996.

Mauve and Widmer, "A survey on Position-Based Routing in Mobile Ad Hoc Networks," IEEE Network, Nov./Dec. 2001.

Mayer, Erwin, "An Evaluation Framework for Multicast Ordering Protocols," ACM, 1992, pp. 177-187.

McCarthy, Vance, "Fast Ethernet and VLANs," Datamation, Apr. 1, 1996, V.42, No. 7, p. 13.

McConnell, John, "VLANs are Here to Stay," Network World, Jul. 1, 1996, p. 37.

McGeough, J., "Location-Based Services and Topology," Jul. 26, 2001.

McGeough, J., "Wireless Location Positioning From Existing Signal Level Data," Dec. 12, 2001.

McGibbon, Alex, "Virtual LANs Come of Age," Telecommunications, Jun. 1996, pp. 48-52.

McKeown, Nick, et al., "The Bay Bridge: A High Speed Bridge/Router," Protocols for High-Speed Networks, III (C-9), 1992, pp. 203-218.

McKinley, Philip, and Liu, Jane W.S., "Multicast Routing in Bus-Based Computer Networks," IEEE, 1988, pp. 277-287.

McNealis, Martin, "Re: Revision to SDE," Email dated Nov. 17, 1995.

McNealis, Martin, "Virtual LAN Requirements," Cisco Systems, IEEE 802.1 Interim, Oct. 12, 1995.

Merhar, Milan, "Priority Bits Discussion," Email dated Jun. 7, 1996.

Merhar, Milan, "VLAN Questions/Suggestions," Email dated May 7, 1996.

Merhar, Milan, "VLANs and IP Multicast," Email dated May 9, 1996.

Messier, Fattouche and Peterson, "Locating an IS-95 Mobile Using its Signal," Conf. Rec. The Tenth International Conference on Wireless Communications (Wireless 98). volll, (Calgary, AB, Canada), pp. 562-574.

Meyer, G., "The PPP Encryption Control Protocol (ECP)," Spider Systems, email message, Jun. 1996.

Miller, Ken, "Broadcast News: Multicasting the WAN," Data Communications, V.24, No. 3, Mar. 1995, pp. 25-26.

MMCNEALIS@CISCO.COM, "1995—The year of the Virtual LAN," IEEE Conference Presentation, Maui, Jul. 1995.

Momirov, Milan, "VLANs and IP Multicast," Email dated May 9, 1996.

Moore, Periakaruppan, and Donohoe, "Where in the World is netgeo.caida.org?" Proc. Internet Soc. Con. (INET), 2000.

Moore, Steve, "Virtual LAN Explainer," Computerworld, Jun. 13, 1994, V.28, No. 24, p. 85.

Moy, John, "MOSPF: Bringing Multicast to Commercial TCP/IP Nets," Network World, V.11, No. 25, Jun. 20, 1994, pp. 11,20.

Moy, John, "Multicast Routing Extensions for OSPF," Communications of the ACM, V.37, No. 8, Aug. 1994, pp. 61-66.

Network Working Group Request for Comments: 1072, "TCP Extensions for long-Delay Paths," Sep. 1997.

Ngoh, L.H., "Multicast Support for Group Communications," Computer Networks and ISDN Systems, 1991, pp. 165-178.

Ngoh, L.H., and Hopkins, T.P., "Transport Protocol Requirements for Distributed Multimedia Information Systems," The Computer Journal, V.32, No. 3, 1989, pp. 252-261.

Niculescu and Nath, "Adhoc Positioning System (APS)," In IEEE GlobeCom, Nov. 2001.
Olsen, Bob, "Up Close: Populating a Virtual LAN," Network World, Oct. 30, 1995, V.12, No. 44, p. 49.
Open Shortest Path First, Inernetworking Technology Overview (1999).
Padmanabhan and Subramanian, "An Investigation of Geographic Mapping Techniques for Internet Hosts," SIGCOMM '01, Aug. 27-31, 2001, San Diego, CA.
Padmanabhan and Subramanian, "Determining the Geographic Locations of Internet Hosts," In Proc. ACM SIGCOMM, Aug. 2001.
Pahlavan and Li, "Indoor Geolocation Science and Technology," IEEE Comminications Magazine, Feb. 2002.
Partridge et al., "A Faster UDP," IEEE/ACM Trans. On Networking, Aug. 1993.
Passmore, David and Freeman, John, "The Virtual LAN Technology Report", Decisys, Inc., May 1996.
Pattavina, Achille, "Design and Performance Evaluation of a Packet Switch for Broadband Central Offices," INFOCOM Dept., University "La Sapienza", Rome, Italy, 1990, pp. 1252-1259.
Paul, Sanjoy, et al., "Multicast Transport Protocols for High Speed Networks," IEEE Apr. 1994, pp. 4-14.
Perlman, Radia, "An Algorithm for Distributed Computation of a Spanning Tree in an Extended LAN," Proceedings—Ninth Data Communications Symposium, Whistler Mountain, British Columbia, Sep. 10-13, 1985.
Perry, Yonadev, "Re: Re: Re: Revision to SDE," Email dated Nov. 27, 1995.
Perry, Yonadev, "Re: Revision to SDE," Email dated Nov. 26, 1995.
Petrosky, Mary, "HUB Shopping Spree," Network World, May 29, 1995.
Polk and Tang, "Spactial Location Server Authentication," Internet Draft (Mar. 2000).
Postel, J. and Reynolds, J., "A Standard for the Transmission of IP Datagrams Over IEEE 802 Networks," Network Working Group—RFC 1042 Memo, Feb. 1988, pp. 1-15.
Priyantha, N., "Providing Precise Indoor Location Information to Mobile Devices," Master's thesis, Massachusetts Institute of Technology, Jan. 2001.
Rajagopalan, Bala, "Reliability and Scaling Issues in Multicast Communication," Computer Communication Review, SIGCOMM 1992 Conference Proceedings, Baltimore, MD, Aug. 17-20, pp. 188-198.
Rand, D., "The PPP Compression Control Protocol (CCP)," Novell, email message, Jun. 1996.
Rijsinghani, Anil, "minutes from day 3 of Interim 802.1 meeting," Email dated Oct. 19, 1995.
Rijsinghani, Anil, "Re: 802.1Q VLAN PAR Backwards Interoperability (802.5/FDDI Coding Issue)," Email dated Jun. 13, 1996.
Rijsinghani, Anil, "Re: VLAN Progress, Tagging, SDE etc.—Just Hold It Please," Email dated Nov. 24, 1995.
Rios, S., "Location Based Service: Interfacing to a Mobile Positioning Center," retrieved from www.wirelessdevnet.com/lbs/features/lbsinterfacing.html, Jun. 2002.
Revers, JR, "Re: VLAN Questions/Suggestions," Email dated May 6, 1996.
Rizzo, L., "Issues in the implementation of selective acknowledgements for TCP," email message, Jan. 1996.
Salwen, Howard et al., "Examination of the Applicability of Router and Bridging Techniques," IEEE Network, V.2, No. 1, Jan. 1988, pp. 77-80.
Saunders, Stephen, "Building Virtual LANs on a Real-World Budget," Data Communications, Sep. 21, 1995, pp. 39-40.
Saunders, Stephen, "Making Virtual LANs a Virtual Snap," Data Communications, Jan. 1995, pp. 72-74.
Saunders, Stephen, "Matrix-Based Switching Revs Up the LAN," Data Communications, Mar. 21, 1994, pp. 35-36.
Saunders, Stephen, "Switch Puts Virtual LANs on Automatic Pilot," Data Communications, Sep. 1994, pp. 45-46.
Sayed, Ayman, "Re: Revision to SDE," Email dated Nov. 22, 1995.
Seaman, Mark, "For 802.0—Proposed 802.1 PAR," Email dated May 26, 1995.
Seaman, Mark, "Re: IEEE Plenary—VLANs—802.1 Meeting" Email dated Jul. 4, 1995.
Seaman, Mick, "[Mark Sankey/US/3Com: Gigabit Enet and VLAN]," Email dated Apr. 13, 1996.
Seaman, Mick, "802.1 Interim Meeting—VLANs—Objectives, Contributions, Agenda," Email dated May 3, 1996.
Seaman, Mick, "802.1 Interim on VLANs: Discussion of Requirements," Email dated Oct. 25, 1995.
Seaman, Mick, "802.1 VLAN Interim Meeting—Reminder and Initial Agenda," Email dated Jan. 22, 1996.
Seaman, Mick, "VLAN Progress, Tagging, SDE etc.—Just Hold It Please," Email dated Nov. 22, 1995.
Seamen, Mick, "Foil for Discussion, IEEE 802.1 Closing Plenary," IEEE 802.1 Meeting, Jul. 11, 1996.
Seamn, Mick, "802.1 Agenda, Denver Interim Meeting (VLANs, etc.)," Email dated Jul. 28, 1995.
Seifert, Rich, "Re: Type Field Values," Email dated May 29, 1996.
Seifert, William M., "Bridges and Routers," IEEE Network, V. 2, No. 1, Jan. 1988, pp. 57-64.
Seifert, William M., "Bridges and Routers," IEEE Network, V.2, No. 1, Jan. 1988, pp. 57-64.
Sellers, Philip, "Cabletron Gambling on Virtual LANs," Computing Canada, Apr. 25, 1996, V.22, No. 9, p. 27.
Shah, Himanshu, "Re: 802.1Q VLAN PAR Backwards Interoperability (802.5/FDDI Coding Issue)," Email dated Jun. 14, 1996.
Shah, Himanshu, "Re: Re: Revision to SDE," Email.
Sharma et al., "Scalable Timers for Soft State Protocols," Information Sciences Institute, University of Southern California.
Shimada, K. Karl, "VLAN Classes," IEEE 802.1 Interim Meeting Presentation, Denver CO, Oct. 11-13, 1995, Rising Star Research.
Shimada, K. Karl, "VLAN Definition," IEEE 802.1 Interim Meeting Presentation, Denver CO, Oct. 11-13, 1995, Rising Star Research.
Shimada, K. Karl, "VLAN Requirements," IEEE 802.1 Interim Meeting Presentation, Denver CO, Oct. 11-13, 1995, Rising Star Research.
Shimada, Karl K. "802.1 Interim meeting," Email dated Aug. 22, 1995.
Simpson, W., "The Point-to-Point Protocol (PPP)," Daydreamer, Jul. 1994.
Sincoskie, David W., and Cotton, Charles J., "Extended Bridge Algorithms for Large Networks," IEEE Network, V.2, No. 1, Jan. 1988, pp. 16-24.
Slager, "IEEE 802.1 Opening Plenary Minutes," IEEE 802.1 Meeting, University of Twente, Enschede, Netherlands, Jul. 8, 1996.
Slager, R.V., "Email Voting Ballot: P802.1j/D5: Managed Objects for MAC Bridges—Supplement to IEEE Std. 802.1d", IEEE, Aug. 2, 1995.
Slager, Rosemary V., "IEEE 802.1 (unofficial) VLAN Meeting Minutes," IEEE 802.1 Milpitas, CA, Jan. 24, 25, 1996.
Slager, Rosemary, "802.1 Interim Meeting Minutes," 802.1 Interim Meeting, Wakefield, MA, Jun. 1996.
Slager, Rosemary, "IEEE 802.1 Interim Meeting Minutes," IEEE 802.1 Meeting, Ottawa, Canada, Oct. 2, 1996 through Oct. 4, 1996.
Slager, Rosemary, "June96 Resolutions," Email dated Jun. 7, 1996.
Slager, Rosemary, "Proposed Minutes," Email dated Jun. 19, 1996.
Slofstra, Martin, "Cisco Unveils Multimedia 'Blueprint'," Computing Canada, V.21, No. 7, Mar. 29, 1995, p. 21.
Small, Smailagic and Siewiorek, "Determining User Location for Contect Aware Computing Through the Use of a Wireless LAN Infrastructure," retrieved from http://www.cs.cmu.edu/laura/docdir/small00.pdf, 2003.
Stallings, William, "2.2 Communication Switching," Local Networks, 2nd Ed., 1987, pp. 32-33, 410-416, Macmillan Publishing Company, New York, NY.
Sterkel, Terrance E, "Re: VLAN Progress, Tagging, SDE etc.—Just Hold It Please," Email dated Nov. 23, 1995.
Steve <WITZ@CHIPCOM.COM>, "RE: IP Multicast, Floyd Backes's Presentation, Denver," Email dated Nov. 1, 1995.
Steve <WITZ1961@AOL.COM>, "Default VLAN," Email dated May 7, 1996.
Steve <WITZ1961@AOL.COM>, "Loop Issues," Email dated May 9, 1996.
Steve <WITZ1961@AOL.COM>, "VLAN Questions/Suggestions," Email dated May 6, 1996.

Stevens, W., "TCP Slow Start, Congestion Avoidance, Fast Retransmit, and Fast Recovery Algoriths," NOAO, Jan. 1997.
Strigini, Lorenzo, et al., "Multicast Services on High-Speed Interconnected LANs," Proceedings of the IFIP International Workshop on High Speed Local Area Networks, Feb. 1987, pp. 173-176.
Swedberg, G., "Ericsson's mobile location solutions," Ericsson Review No. 4, 1999.
Tang, Polk, Korkea-Aho and Takahashi Internet Draft (Nov. 2000) entitled "Spatial Location Payload Requirements with Protocol Recommendations".
Tang, Ruuru, and Loughney, Internet Draft (Feb. 14, 2000) entitled "Problems and Requirements of Some IP Applications Based on Spatial Location Information,".
Tannenbaum, Todd, and Conover, Joel, "Managing Your Switched Networks," Network Computing, Jun. 15, 1996.
Tasker, Robin, "Re: Revision to SDE," Email dated Nov. 27, 1995.
TCP Selevtive Acknoledgement option (and related changes) for FreeBSD, Sep. 1997.
Thaler, Pat, "Re: Revision to SDE," Email dated Nov. 27, 1995.
Thompson, Geoff, "Re: Re: Re: Revision to SDE," Email dated Nov. 27, 1995.
TrueSystems.com Inc. "HIPAA & TRUESCCESS," 2001, p. 1.
US Patent Application File Wrapper U.S. Appl. No. 07/773,161.
Vielmetti, Edward et al., "Messages for Dec 1992," Google Groups: comp.dcom.isdn, Message board thread, Dec. 1992.
Waitzman, D., et al., "Distance Vector Multicast Routing Protocol," Network Working Group—RFC 1075, Nov. 1988, pp. 1-24.
Wakerly, John, "An Efficient Frame-Tagging Format for VLANs," IEEE 802.1 Meeting Presentation, Jan. 24-25, 1996.
Wakerly, John, "FDDI VLAN Frame Format—Two Alternate Interpretations," Email dated Jun. 14, 1996.
Wakerly, John, "Forwarding Methods for VLAN-Tagged Frames in a Bridged LAN," IEEE 802.1 Meeting Presentation, Jan. 24-25, 1996.
Wakerly, John, "Implementation Subgroup Notes," Email dated Oct. 19, 1995, IEEE 802.1 Interim Meeting.
Wakerly, John, "Re: Default VLAN & loops," Email dated May 7, 1996.
Wakerly, John, "Re: Properties of Methods A and B for FDD1 and 802.5 VLAN Frame Format," Email dated Jun. 20, 1996.
Wakerly, John, "Technical Contributions for January Interim Meeting," Email dated Nov. 29, 1995.
Wakerty, John and Cheriton, David R., "Virtual LAN Management Protocol (VLMP)" IEEE 802.1 Meeting, Oct. 11-13, 1995, Alantec.
Wakerty, John, "Some VLAN Styles," IEEE 802.1 Meeting, Oct. 11-13, 1995, Alantec.
Wall, David Wayne, "Mechanisms for Broadcast and Selective Broadcast," Dissertation—Stanford University Graduate Studies, University Microfilms International, Jun. 1980, pp. 1-87.
Walther and Fischer, "LocaPhone—Location-Aware group Communication for Mobile Groups," retrieved from www.isoc.org/isoc/conferences/inet/01/CD_proceedings/T70/walther.pdf, Jul. 2002.
Wang, Peter, et al. "Email Voting Ballots: P802/D21: Overview and Architecture (second edition)," IEEE, Oct. 20, 1995.
Want et al., "The Active Badge Location System," ACM Trans Info. Sys., vol. 10, Jan. 1992.
Ward, Jones and Hopper, "A new Location Technique for the Active Office," IEEE Personal Comm. vol. 4, Oct. 1997.
Warwick, Trevor, "Re: Flow control contribution," Email dated Mar. 14, 1995.
Waters, A.G., "Multicast Provision for High Speed Networks," Proceedings of the IFIP TC6/WG6.4 Fourth International Conference on High Speed Performance Networking, Liege, Belgium, Dec. 14-18, 1992, pp. 317-348.
Waters, Gillian A., et al., "The Use of Broadcast Techniques on the Universe Network," ACM, 1984, pp. 52-57.
Werb and Lanzl, "Designing a Positioning System for Finding Things and People Indoors," IEEE Spectrum, Sep. 1998.
Williamson R., "Introduction to Location based Services for Mobile Wireless Users," Approach to Training Situation Awareness, retrieved from www.ecdesignnet.com/papers/location%20Based%20Services%202002.htm, Jul. 2002.
Wright, Michele, "Re: VLAN Questions/Suggestions," Email dated May 6, 1996.
Wright, Michele, "Re[2]: VLAN Questions/Suggestions," Email dated May 7, 1996.
Written Opinion and Search Report from PCT US99/22919, Jan. 30, 2001 (10 pages).
Written Opinion from PCT/US03/06169, Aug. 13, 2005 (5 pages).
Yang, Henry and Rijsinghani, Anil, "Some VLAN Requirements & Considerations," IEEE 802.1 Maui, Jul. 11, 1995.
Zagami and Parl, "Providing a Universal Location Services Using a Wireless E911 Location Network," IEEE Communications Magazine, Apr. 1998.
Zipf, A., "User-Adaptive Maps for Location-Based Services (LBS) for Tourism," Proc. Of ENTER Comm. Tech in Tourism, Innsbruck Austria, Springer Computer Science, 2002.
Zwicker, H.R., "Netzwerke—Die Informationstransporter der Moderne," Elektrotechnik, Jun. 1993.

* cited by examiner

| Information | Change triggers | Policies |
|---|---|---|
| Address Block | Change in address | Admin preset |
| User ID | Time Outs | Internet Access Only |
| Device type | Link Changes, up/down, speed | IEEE 802.1X Authentication Required |
| Device Location | User Changes | Disable Unused Ports |
| Access Device | Device Changes | Reset On Intrusion Detection |
| Access Location | Device Additions | Specific Application Access Only |
| Port Type and Speed | Network Service Changes | Priority Access |
| Users Per Port | Access Device Changes | Application Bandwidth Limits |
| Time Of Access | Application Access Request | Multi-step authentication |
| Application Priority | Protocol Change | Log All Traffic |
| Port Security | Additional Wireless User | Set Group Characteristic Rules |
| Ethernet Protocol | Bandwidth Changes | Flow Logging |
| Level of Trust | Routing Link Cost Changes | Limit Port Setting (speed, priority, ACL) |
| Virus Scan level | RMON or Other Monitored Events | Phone Access Only |
| Operating System Type and Version | Dynamic Policy Changes (local) | Time-of-Day Based Access (any policy) |
|  | Dynamic Policy Changes (remote) | Stateful Inspection |
| [OTHERS] | [OTHERS] | [OTHERS] |

FIG. 3

SYSTEM AND METHOD FOR ADDRESS BLOCK ENHANCED DYNAMIC NETWORK POLICY MANAGEMENT

RELATED APPLICATIONS

This application claims the priority of U.S. Provisional Application Ser. No. 60/599,626, entitled "System and Method for Address Block Enhanced Dynamic Network Policy Management", and filed 6 Aug. 2004; which is herein incorporated by reference.

This application is a continuation-in-part of U.S. patent application Ser. No. 11/066,622, filed 25 Feb. 2005, and entitled "DYNAMIC NETWORK DETECTION SYSTEM AND METHOD"; which is herein incorporated by reference.

TECHNICAL FIELD

The present embodiment relates to comprehensive and continuous control of usage of network services. More particularly, the present embodiment relates to static and dynamic policy allocation for network service provisioning based on address block techniques. Specifically the use of the IEEE 802 Organization Unique Identifiers (OUI), Individual Address Block (IAB) assignments of the MAC addresses provided by the IEEE 802 organization or the local address administration as an input into the decision process in policy, authorization, network admission and network service attribute assignment.

BACKGROUND

Computing systems are useful tools for the exchange of information among individuals. The information may include, but is not limited to, data, voice, graphics, and video. The exchange is established through interconnections linking the computing systems together in a way that permits the transfer of electronic signals that represent the information. The interconnections may be either cable or wireless. Cable connections include, for example, metal and optical fiber elements. Wireless connections include, for example infrared, acoustic, and radio wave transmissions.

Interconnected computing systems having some sort of commonality are represented as a network. For example, individuals associated with a college campus may each have a computing device. In addition, there may be shared printers and remotely located application servers distributed throughout the campus. There is commonality among the individuals in that they all are associated with the college in some way. The same can be said for individuals and their computing arrangements in other environments including, for example, healthcare facilities, manufacturing sites and Internet access users. A network permits communication or signal exchange among the various computing systems of the common group in some selectable way. The interconnection of those computing systems, as well as the devices that regulate and facilitate the exchange among the systems, represent a network. Further, networks may be interconnected together to establish internetworks. For purposes of the description of the present embodiment, the devices and functions that establish the interconnection represent the network infrastructure. The users, computing devices and the like that use that network infrastructure to communicate are referred to herein as attached functions and will be further defined. The combination of the attached functions and the network infrastructure will be referred to as a network system.

The process by which the various computing systems of a network or internetwork communicate is generally regulated by agreed-upon signal exchange standards and protocols embodied in network interface cards or circuitry and software, firmware and microcoded algorithms. Such standards and protocols were borne out of the need and desire to provide interoperability among the array of computing systems available from a plurality of suppliers. Two organizations that have been responsible for signal exchange standardization are the Institute of Electrical and Electronic Engineers (IEEE) and the Internet Engineering Task Force (IETF). In particular, the IEEE standards for internetwork operability have been established, or are in the process of being established, under the purview of the IEEE 802 committee on Local Area Networks (LANs) and Metropolitan Area Networks (MANs). The IEEE 802 also provide a service in the assignment of OUI and IAB values to define unique address space which may be assigned to individual organizations.

The identified organizations generally focus on the mechanics of network and internetwork operation, less so on rules and restrictions on access to, and the provisioning of services associated with, the network. Presently, access to applications, files, databases, programs, and other capabilities associated with the entirety of a discrete network is restricted primarily based on the identity of the user and/or the network attached function. For the purpose of the description of the present embodiment, a "user" is a human being who interfaces via a computing device with the services associated with a network. For further purposes of clarity, a "network attached function" or an "attached function" may be a user connected to the network through a computing device and a network interface device, an attached device connected to the network, a function using the services of or providing services to the network, or an application associated with an attached device. Upon authentication of the offered attached function identity, that attached function may access network services at the level permitted for that identification. For purposes of the present description, "network services" include, but are not limited to, access, Quality of Service (QoS), bandwidth, priority, computer programs, applications, databases, files, and network and server control systems that attached functions may use or manipulate for the purpose of conducting the business of the enterprise employing the network as an enterprise asset. The basis upon which the network administrator grants particular permissions to particular attached functions in combination with the permissions is an established network usage policy. For example, one policy may be that any user (one type of attached function) with an employee identification number is granted access to the enterprise's electronic mail system at a specified bandwidth and QoS level.

Presently, the network administrator establishes policies. The policies are defined in and regulated through a policy server controlled by the administrator. The established policies are transmitted to the network interface devices of the network infrastructure at the connection point or port. As part of the authentication process, a particular set of policies are established by the administrator for that attached function. That is, the port at which that attached function is attached to the network infrastructure is configured to effect those policies. For example, QoS, bandwidth, and priority levels may be set at certain values for one identified attached function and at different levels for another attached function. Once that set of policies has been established for that attached function, there is typically no coordinated mechanism to revise the set of policies during network connection based on a change of circumstances.

Unfortunately, events and activities do occur that may be harmful to the network system. For purposes of this description, harm to the network system includes, for example, access denial, intentionally tying up network computing resources, intentionally forcing bandwidth availability reduction, and restricting, denying or modifying network-related information. There are currently two generally available forms of network protection designed to minimize such types of network harm. Firewalls are designed to prevent the passage of packets to the network based on certain limited specific conditions associated with the packets. Firewalls do not enable assigned policy modifications. Intrusion Detection Systems (IDS) are designed to observe packets, the state of packets, and patterns of usage of packets entering or within the network infrastructure for harmful behavior. However, the available IDS only report the existence of potentially harmful anomalies and do not enable responsive policy modification. Any adjustment to the state of permitted attached function network usage typically occurs manually after evaluation of the detected anomalies. There is presently little comprehensive capability available for continuous network system monitoring and network-forced adjustment or change of assigned network usage permissions based upon the detection of one or more conditions that would trigger such a change.

In certain limited instances, network usage (meaning first entry to the network system for the purpose of accessing the network services and the subsequent use of such services) may be restricted for reasons other than user authentication. For example, an attached function seeking usage of a discrete network system through dial-up or virtual private networking may be isolated from certain network services simply because private network entry is made through a public portal, i.e., the internet. It is also understood that in certain academic settings offering wireless connectivity, network usage may be limited upon detection of attached function attempts to seek unauthorized access to specified restricted network services. Further, the use of dynamic policy assignment has been defined and extended in co-pending U.S. patent application Ser. No. 10/629,331 entitled "System and Method for Dynamic Network Policy Management" of John Roese et al. and assigned to a common assignee. Even this work, however, leaves cases of insufficient information available to make proper Acceptable Use Policy (AUP) assignments or other dynamic policy decisions. Thus the network system is unable to provide proper services and unable to limit the traffic to and from an attached device sufficiently to: (a) protect the network from an unknown device; and (b) protect the device from attack by the network or from devices/attackers through the network infrastructure. This failure or inability to protect devices such as process or manufacturing control devices from attack by or through the network interface is the exact reason so few systems may be networked beyond the locked doors and well controlled physical access. Despite the benefit of data collection, software updates, and closed loop operation capabilities, the fear and reality of the device vulnerabilities limit the network extent and scale granted to these devices. Often these and other devices lack the security or software and features to interact in a secure network environment. Authentication capabilities may be non-existent; no human user may ever be associated with the device or device may have no interface for authentication, such as WiFi phones.

SUMMARY OF THE DISCLOSURE

According to one implementation, a method includes acquiring address block information for an attached function that initiates network access on a distributed computing network. Additional policy information in acquired concerning the attached function. One or more access policies are set based, at least in part, on the address block information and the additional policy information.

One or more of the following features may also be included. The address block information may be obtained from an OUI field of a MAC address. Acquiring additional policy information may include obtaining stored policy information, or querying the attached function for policy information. The additional policy information may include one or more of: attached function location information; attached function configuration information; attached function operating system information; attached function security features information; user location information; and network entry port information. Network operations of the distributed computing network may be monitored to detect when the attached function initiates network access. The attached function may be authenticated in response to the attached function initiating network access.

According to another implementation, a computer program product residing on a computer readable medium has a plurality of instructions stored on it. When the instructions are executed by a processor, the instructions cause the processor to acquire address block information for an attached function that initiates network access on a distributed computing network. Additional policy information in acquired concerning the attached function. One or more access policies are set based, at least in part, on the address block information and the additional policy information.

One or more of the following features may also be included. The address block information may be obtained from an OUI field of a MAC address. Acquiring additional policy information may include obtaining stored policy information, or querying the attached function for policy information. The additional policy information may include one or more of: attached function location information; attached function configuration information; attached function operating system information; attached function security features information; user location information; and network entry port information. Network operations of the distributed computing network may be monitored to detect when the attached function initiates network access. The attached function may be authenticated in response to the attached function initiating network access.

According to another implementation, a system is configured for acquiring address block information for an attached function that initiates network access on a distributed computing network. Additional policy information in acquired concerning the attached function. One or more access policies are set based, at least in part, on the address block information and the additional policy information.

One or more of the following features may also be included. The address block information may be obtained from an OUI field of a MAC address. Acquiring additional policy information may include obtaining stored policy information, or querying the attached function for policy information. The additional policy information may include one or more of: attached function location information; attached function configuration information; attached function operating system information; attached function security features information; user location information; and network entry port information. Network operations of the distributed computing network may be monitored to detect when the attached function initiates network access. The attached function may be authenticated in response to the attached function initiating network access.

The details of one or more implementations is set forth in the accompanying drawings and the description below. Other features and advantages will become apparent from the description, the drawings, and the claims.

DETAILED DESCRIPTION OF THE PREFERRED EMBODIMENTS

In a general aspect, the embodiment adds another element to a dynamic policing system. The use of the OUI field within the MAC address of the IEEE 802 assigned Ethernet address provides another useful data point for dynamic policy and AUP assignment. The OUI is often referred to as the company code and is assigned to a company by the IEEE 802 for use in providing a unique address block to the company for use in their products. IEEE 802 network devices, with the exception of the traditional PC and Laptops, are often becoming specialized commodity items with many dedicated devices emerging. Often the dedicated devices are receiving dedicated OUI identifiers based on the company of origin. Cell phones are a new class of mobile device with this property, for which rapid setup, high QOS and guest service will be required on the enterprise data infrastructure. Additionally, the IEEE address assignment authority has a further refinement of the addressing structure called an Individual Assignment Block (IAB) This block is only 4096 addresses and allows even the smallest business or organization to have unique address groups for their LAN products. In addition to these well defined address blocks, another mechanism exists to provide further meaning and information to an IEEE 802 addressing structure. Local address administration is another technique, whereby the administrators' addresses may be assigned. In a structured approach, these locally administered addresses are generally assigned in groups, blocks, or some organized or hierarchical manner. Local address assignment allows for even stronger association between address and functional capability, network AUP and service requirements, including being the sole definitive, determining factor. These assignments types and techniques of adding grouping and classification to the addressing structure shall be defined herein to be Address Blocks. It should be recognized that the block size may be as large as the addressing capability, or as small as a single address. Additionally, other structure may be added or impressed by assignment or interpretation to the addressing, such as groups within groups or hierarchical mapping. Address blocks may provide at least a strong hint or even a definitive requirement to the network use, capabilities, limitations and needs of the devices using these addresses. Dynamic policy systems may further refine the AUP, ingress and egress policy assignment based on additional data and event information. However, the address block information provides an extremely strong starting point in that process. This address block based starting point for the static or dynamic policy based system may vastly decrease the effort and time to place the device in the "best" policy assigned states. Here, "best" is defined as the most restrictive policies in terms of packets egressing to the device (protect the device from harm by the network) and full coverage of all required ingress capabilities including all features, bandwidth and forwarding QOS metrics, while further limiting its ingress as completely as possible to ONLY the required ingress capabilities (tightly controlled AUP assignment).

The address block can simple be considered another finer grained event in the trigger based system of dynamic policy. A trigger is any detected or observed event, activity, occurrence, information or characteristic identified in a network system by the network administrator as being of interest for the purpose of making a modification to an assigned set of policies. The types of triggers that define usage restrictions may be of any type of interest to the network administrator, including those associated with user authentication as traditionally understood. Examples of relevant triggers will be provided herein. The system configuration can vary and can include any type of data network, including LANs, MANs, Wide Area Networks (WANs), Personal Area Networks (PANs), Virtual Private Networks (VPNs), and Home Networks. The system may be used in any of a variety of ways to improve network usage, configuration accuracy, allocation of network resources, control, and security.

Figure 1:
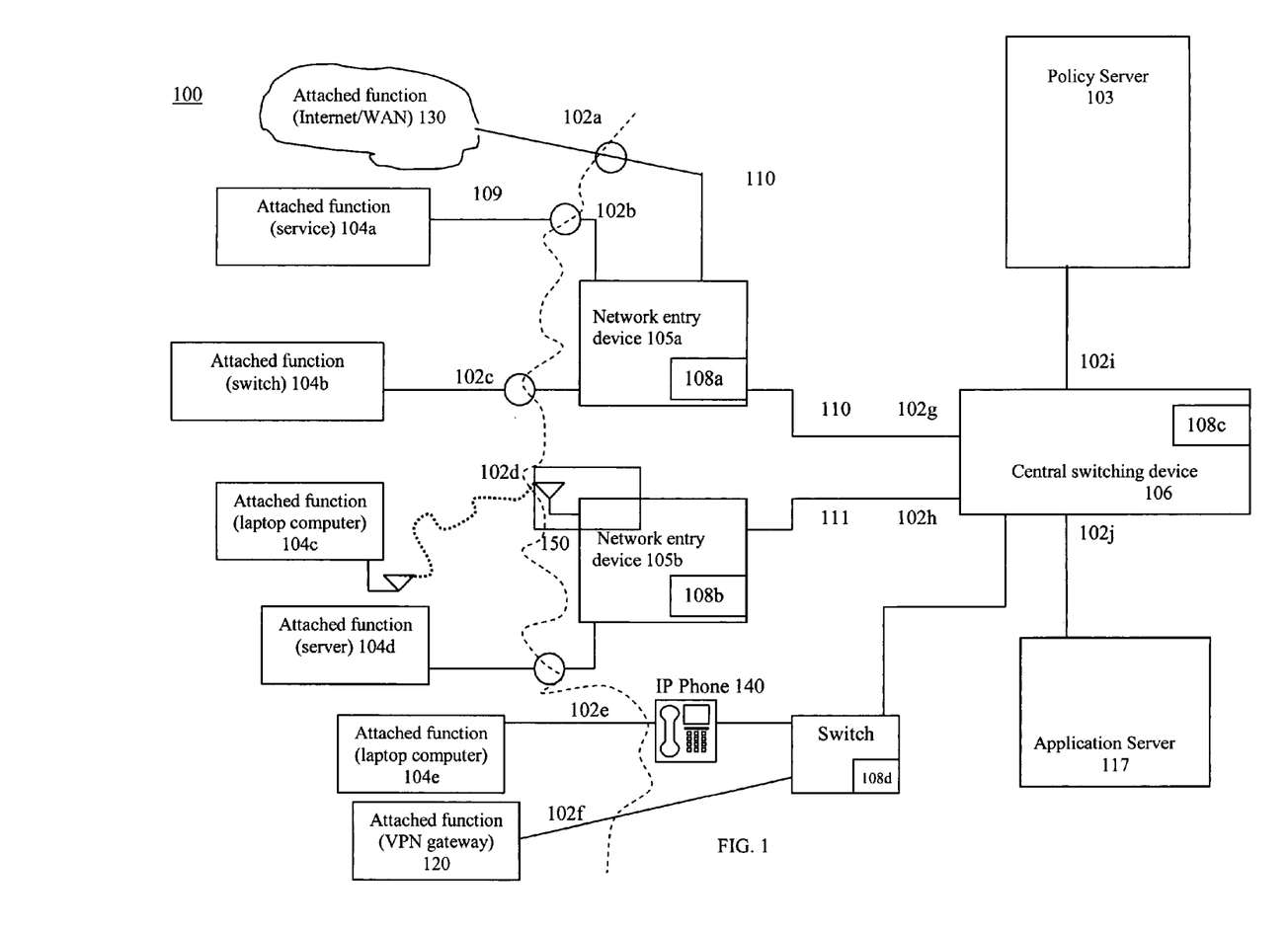
FIG. 1 is a simplified diagrammatic block representation of an example network system with integrated comprehensive access control of the present embodiment.

The present embodiment is a system and related method for provisioning policies to attached functions in a dynamic manner using address block information as an input. Referring to FIG. 1, a network system 100 incorporating the capability of the address block policing system of the present embodiment operates and provides network services to attached functions according to policies assigned to the attached functions. Network system 100 includes a network infrastructure 101 and one or more attached functions connected to or connectable to the network infrastructure 101. The network infrastructure 101 includes multiple switching devices, routing devices, access points, MANs, WANs, VPNs, and internet connectivity interconnected and connectable to by way of connection points (e.g., 102a-k). The policing system of the embodiment employs both hardware and software (e.g., a function embodied in an application executing on policy server 103) to establish network usage control throughout the entire network system 100 at all times as described below. An attached function is external to infrastructure 101 and forms part of network system 100. Examples of attached functions 104a-104d are represented in FIG. 1, and may be any of the types of attached functions previously identified. Network infrastructure entry devices 105a-b of infrastructure 101 provide the means by which the attached functions connect or attach to the infrastructure 101. A network entry device can include and/or be associated with a wireless access point 150. For wireless connection of an attached function to the infrastructure 101, the wireless access point 150 can be an individual device external or internal to the network entry device 104b. A central switching device 106 enables the interconnection of a plurality of network entry devices as well as access to network services, such as policy server 103 or an application server 107. The central switching device 106 further enables the interconnection of the network infrastructure 101 to attached functions that include VPNs (represented by VPN gateway device 120) and WANs (represented by internet cloud 130).

Figure 3:
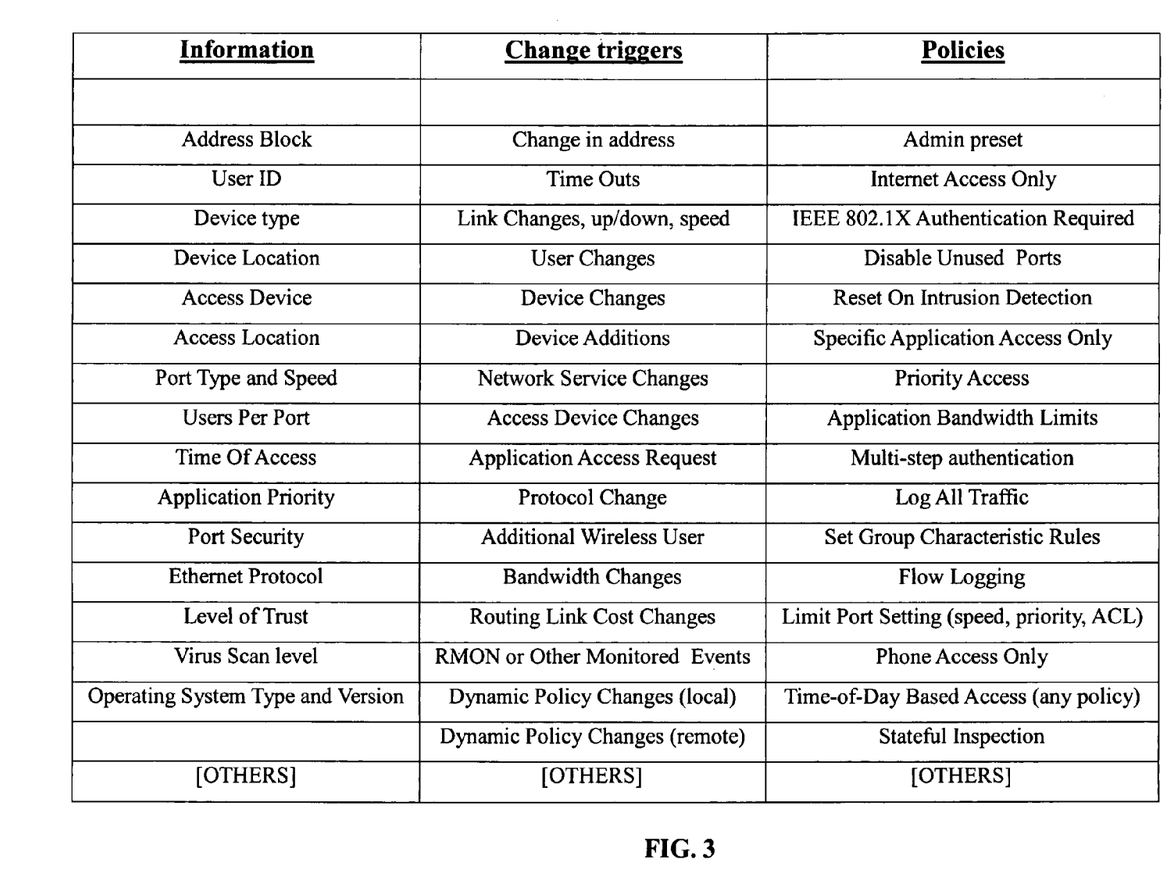
FIG. 3 is a table listing example event information, network occurrences and static and dynamic policies for purposes of controlling network system access and usage through the policing system and method of the present embodiment.

One or more of the devices of the infrastructure 101 include a dynamic policy function module 108 (e.g., modules 108a, 108b, 108c, 108d). The dynamic policy function module 108 includes the sub-functions of monitoring the network for triggers, including address block information, decision making of whether to modify an assigned set of policies and, if so, in what way, and enforcement of the assigned set of policies. The dynamic policy function module 108 of any particular device of infrastructure 101 may include any one or more of the three identified sub-functions. It is contemplated that the policy server 103 under control of the network administrator will have primary responsibility for decision making of assigning and modifying sets of policies. However, it is also contemplated that some decision making may be established in the module 108 of a network device. That is, for example, module 108*c* of central switching device 106 may include the decision making sub-function and modules 108*a* and 108*b* of network entry devices 104*a* and 104*b* (respectively) may have monitoring and enforcement sub-functions for the attached functions to which they are connected. In addition, there may be network devices that have no dynamic policy function module 108. Instead, such "dumb" devices may simply provide packet exchange functionality only and leave monitoring, decision making and enforcement to other devices of the infrastructure 101. The dynamic policy sub-functions may include algorithms and processes necessary to identify information about attached functions, monitor network activity, enforce sets of policies, and make decisions regarding assigned policies. Module 108 can be implemented in hardware and/or software. For example, particular software, firmware, or microcode functions executing on the network infrastructure devices can provide the monitoring functions to be described herein, policy enforcement as presently available in network infrastructure devices, and policy decision making. Alternatively, or in addition, hardware modules, such as programmable arrays, can be used in the devices to provide some or all of those capabilities.

In the illustrated network system 100, an attached function such as a service 104*a* attaches to infrastructure 101 via cable 109 through connection point 102*b* (e.g., a jack in a wall). Similarly, network infrastructure entry devices 105*a-b* and central switching device 106 connect to each other using cables 110 and 111 to connection points 102*g-h*. In a portion of the network employing cables, a connection point (e.g., 102*a-j*) is the terminus of the cable where a device physically attaches.

Access by an attached function to the network services associated with network system 100 includes a setting of static and/or dynamic policies, referred to generally as a set of policies, for the attached function. Sets of policies are established by the network administrator. Information regarding an attached function seeking or having access to network services and the sets of policies may be stored centrally or in a distributed manner, including being stored locally. In an example of a centralized approach, the policying system of the present embodiment stores attached function and policy set information for all of the connection points of the network system 100 in a server such as policy server 103. In an example of a distributed approach, described in more detail in the alternatives section below, the policying system stores attached function and policy set information for all attached functions, or a portion of the attached functions, in one or more of the local network devices 105*a-b* and 106 of the network infrastructure 101.

The system of the present embodiment is able to enforce established and generated policies, on an initial and continual basis, based on usage permission rules established by a network administrator and these may contain address block information. It can restrict usage of the network system and its services based on the attached function's characteristics, the particular connection point through which network infrastructure connection is established, and network system events related or unrelated to the attached function. All policy sets may be directed to all network entry devices. Alternatively, the policy sets may be apportioned among the network entry devices and attached functions forced to particular connection points based on established sets of policies. It is contemplated that multiple policies will be applied to the connection points, some with overlapping purpose. Also, some policies configured at the network entry devices may be applicable to some attached functions but not to others.

Figure 2:
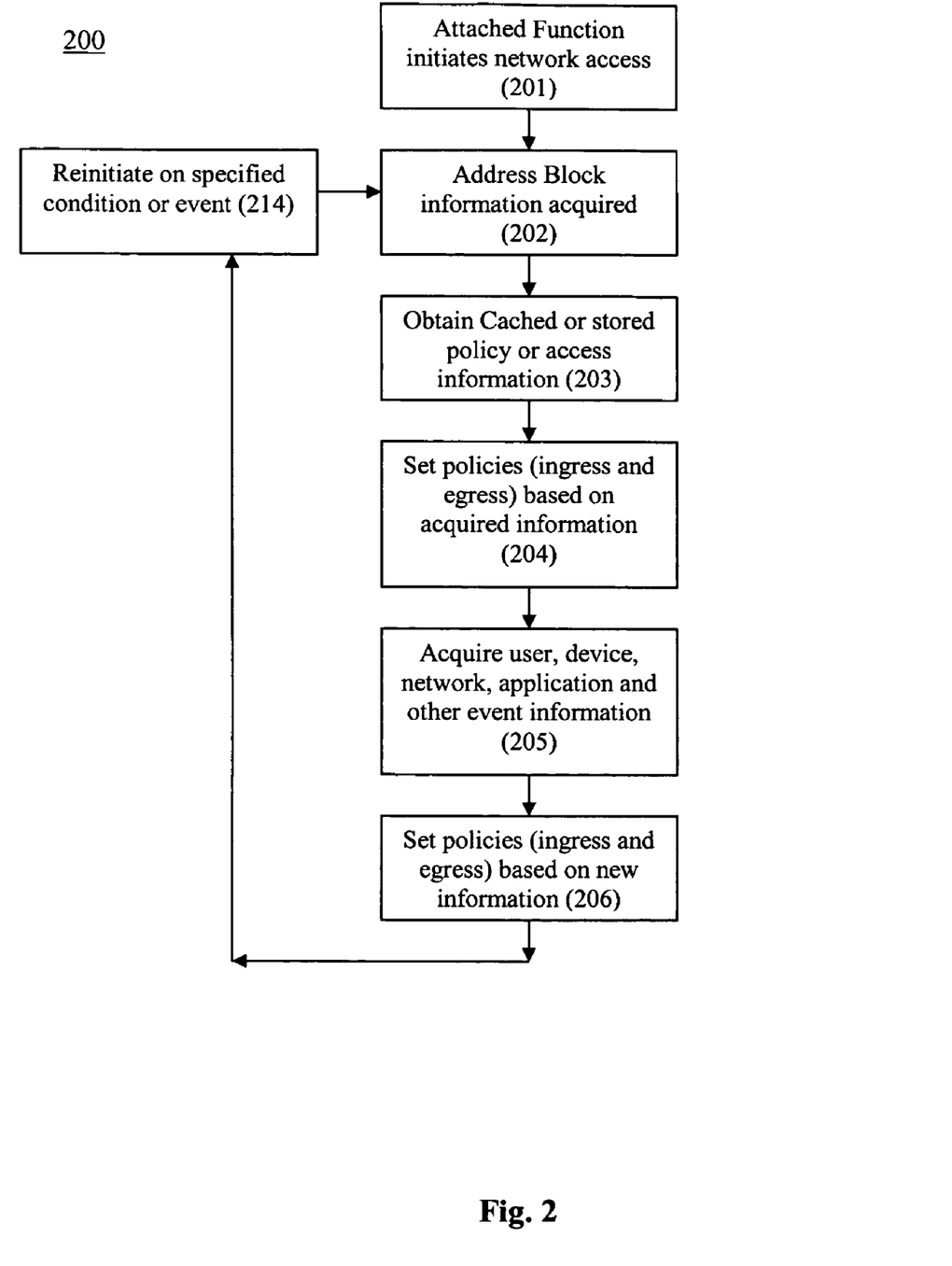
FIG. 2 is a flow diagram of an illustrative preliminary network access and policy process of the present embodiment.

As illustrated in FIG. 2, a preliminary process for network entry 200 of the present embodiment includes the initial steps of the complete process to regulate usage of the network system 100 throughout the entirety of a network session. The entry process 200 may be started using conventional entry methods upon attached function initiation of a network entry request (step 201) such as by booting up a device or initiating a connection to a network entry device at a connection point using a computing device such as a computer. The network control system then initiates attached function authentication methods, if available, or may rely entirely on cached information and address block recognition capability.

Entry to the network system 100, and the infrastructure 101 primarily, may also be initially regulated using authentication systems such as Network Operating Systems (NOSs), Remote Authentication Dial-In User Service (RADIUS), described in IETF Request For Comment (RFC) 2138, IEEE 802.1X standard and/or address block information and other techniques.

In addition to acquiring the attached function information necessary to authenticate access to the network services, the policying system is configured to obtain stored information or query the attached function (step 203) for such further additional information identified by the network administrator as being of importance in assessing relevant policies. Such further additional information includes, but is not limited to: attached function location, attached function configuration, attached function operating system, attached function security features, user location, and network entry port information. Based upon information obtained using address block information (step 202) and the additional attached function information (if any) (step 203), the system 100 makes a preliminary determination of the attached function's permission to access network services (step 204). If the information acquired is authenticated or otherwise accepted, the attached function enters the network. The process 200 further includes a check on whether additional challenges have been established upon preliminary permitted entry to the network infrastructure 101, or if additional external challenges have been established. Process 200 continues with the normal dynamic policy process of obtaining network, user, device, application information (step 205) and applying dynamic policy rules applicable to such events (step 206), as disclosed in U.S. patent application Ser. No. 11/066,622, filed 25 Feb. 2005, and entitled "DYNAMIC NETWORK DETECTION SYSTEM AND METHOD".

FIG. 3 provides a list of the types of information variables that may be employed to determine static and dynamic policies. FIG. 3 further provides a list of the triggering events, activities, or occurrences that may result in a change of dynamic or static policy. FIG. 3, still further, provides a list of the types of policies that may be changed, which policies may be static policies or dynamic policies. It is to be understood that FIG. 3 provides a representative sampling of the information, activities and policies that may be identified, examined, and/or changed pursuant to the system of the present embodiment. It is also to be understood that static policies may be converted into dynamic policies and dynamic policies may be converted into static policies. It is also to be understood that any packet-based information to or from a local connection port, any network information, any attached function information (including all other ports), any algorithmically-derived information based on history, time, time of day, or combinations of any or all data may be the type of information included in Column 1 of FIG. 3. It is also further to be understood that any changes to Column 1 or to Column 3 may be a change triggering event in Column 2 of FIG. 3. Still further, it is also to be understood that the degree of control may be varied for any of the policies identified in Column 3 of FIG. 3.

The policing system of the present embodiment is configured to maintain and update the information associated with the attached functions and the network infrastructure 101 of the network system 100 in a centralized database, including the saved policies history. Alternatively, the saved policies history may be stored in a distributed manner, including, for example, being stored or cached on a local network access device. The information included in the database can vary. For example, a table containing the information may form part of or be accessible by the database. Such a table may associate each attached function with one or more access devices, one or more access connection points, applications requested, priority requested, as well as other information of the type represented in FIG. 3. If the assigned policy information is cached in a centralized, distributed or local way, it may be invalidated or otherwise eliminated as desired by the network administrator based on time, size limitations, storage limits, changes in caching policies, changes in assigned policies, or other events, conditions or other types of triggers in the network system 100.

Use of the above techniques enables the system of the present embodiment to restrict access to the network system 100 and network services including, but not limited to data, applications, specific network infrastructure devices, data and network service, QoS levels, network tools, and the like, based on the attached function and the connection point through which the attached function seeks network usage, and based on monitored triggers. Further to the techniques above, system 100 can employ the specified information to effect a modification of the usage requirements. For example, when an attached function is permitted network services usage via a connection point deemed not to be inherently secure (e.g., an edge switch port associated with an external internet connection), the policing system can prompt the attached function to initiate an improved connection, such as a VPN, or can notify the attached function that supplemental restrictions apply while in the insecure area. More generally, this can be seen as an expansion of policy-based usage in that the usage rules for an individual attached function may be adapted at any time for any reason. Policies may be changed upon access request, during a session, or even during an exchange flow.

As noted, the present system and related method employ a centralized policy server 103 that includes network usage policy enforcement and decision making capabilities. It may also include the policy information database. Also as indicated, that functionality may be distributed throughout the infrastructure 101. As described below, for a distributed system example, devices both inside and outside network infrastructure 101 can optionally maintain policy information that affects their operation. Relatedly, the policy information may be stored in the centralized policy server 103, distributed, or stored or cached locally for rapid access and access permissions established by the designated policies.

FIG. 1 shows the dynamic policy function modules 108 as components of the devices of the infrastructure 101 for illustrative purposes only. The information representing the one or more dynamic policy sub-functions associated with a particular network device, or one or more network devices attached to a particular network device, may be preloaded into module 108 in the form of a policy database. The policy database at each device can be the entire policy database of network system 100, or a portion of that database. In particular, the portion of the database included in the module 108 of the device can be a portion associated with those connection points applicable to that particular device. For example, all of the connection points associated with the ports of a particular network entry device. Module 108 may include the table of FIG. 3 that is an updateable table that changes with additions or deletions of information, detected triggers, and static and dynamic policies. Additionally, a table of actual policy designations is preferably generated and may be stored or cached locally and called upon for subsequent sessions based on attached function information.

The following is a list of a few possible devices (but not limited to only those devices) that can contain the policy server and/or any one or more of the dynamic policy sub-functions: network switches, data switches, routers, firewalls, gateways, computing devices such as network file servers or dedicated usage servers, management stations, network connected voice over IP/voice over data systems such as hybrid PBXs and VoIP call managers, network layer address configuration/system configuration servers such as enhanced DHCP servers, enhanced Bootstrap Protocol (bootp) servers, IPv6 address auto-discovery enabled routers, and network based authentication servers providing services such as radius, extensible authentication protocol/IEEE 802.1X or others.

Additionally, the processes, steps thereof and various examples and variations of these processes and steps, individually or in combination, may be implemented as a computer program product tangibly as computer-readable signals on a computer-readable medium, for example, a non-volatile recording medium, an integrated circuit memory element, or a combination thereof. Such computer program product may include computer-readable signals tangibly embodied on the computer-readable medium, where such signals define instructions, for example, as part of one or more programs that, as a result of being executed by a computer, instruct the computer to perform one or more processes or acts described herein, and/or various examples, variations and combinations thereof. Such instructions may be written in any of a plurality of programming languages, for example, Java, Visual Basic, C, or C++, Fortran, Pascal, Eiffel, Basic, COBOL, and the like, or any of a variety of combinations thereof. The computer-readable medium on which such instructions are stored may reside on one or more of the components of system 100 described above and may be distributed across one or more such components.

The following examples may help illustrate the embodiment:

Example 1

To automatically detect all Avaya IP phones in a network, one could use this feature to look for any attached device with the Avaya OUI of "00-04-OD" and associate those devices to a restrictive role suitable for IP phones. Continuing dynamic policy management may then further modify the port policies.

Example 2

To detect all HP printers using JetDirect cards, the HP OUI could be used as a trigger. Possible policy assignments would be to allow LPR or other printing protocols at 5 MB/S, allow administrative protocols only from the network operations center IP addresses and finally prohibit all other protocols. The result is that the printer is manageable, useable and protected dynamically from all other attacks.

Example 3

To detect the attachment of an IP enabled Allen Bradley numerically controlled milling machine or other industrial systems, the presence of OUI "00-00-BC" would be enough to trigger a policy set appropriate for that type of system. Egress policies to that machine may be extremely tight allowing no packet for which older equipment may have known security vulnerabilities.

Example 4

Attachment of WiFi enabled IP phones need proper detection to give them access to real time service over an enterprise guest network. This is needed as these devices are not able to authenticate via traditional techniques, as a PC could, and therefore should be less trusted, but they require higher priority services for RTP and SIP than a user in the default guest role. OUI detection could allow for a slight over-ride of default policies without requiring complex authentication methods.

Example 5

Specific assignment of local addresses to devices with known security vulnerabilities would allow their use on a network system which could otherwise exploit those vulnerabilities. The network devices could cache policy and AUP assignments and enable them independent of any other authentication techniques or methods to insure both ingress and egress policies are in place immediately upon network connection. This would make it impossible to exploit known device vulnerabilities, even for the hacker who knows the device is present on the network.

A number of examples to help illustrate the embodiment have been described. Nevertheless, it will be understood that various modifications may be made without departing from the spirit and scope of the embodiment. Accordingly, other embodiments are within the scope of this embodiment.

What is claimed is:

1. A method comprising:
   receiving a packet, by a network device, from an attached function that initiates network access on a distributed computing network, wherein the packet is received without errors with a valid source address in a source address field;
   acquiring source address block information from at least an OUI (Organization Unique Identifier) field of a MAC address or an IAB (Individual Address Block) address block for the attached function from the received packet, wherein the source address block information represents a subset of a total addressing capability;
   in response to acquiring the source address block information, obtaining stored policy information based, at least in part, on the source address block information;
   determining one or more policies based, at least in part, on the source address block information, wherein the one or more policies include one or more of an ingress and an egress policy, wherein the source address block information is used as a starting point in defining restrictive policies to securely protect network devices;
   setting, by the network device, the one or more determined policies; and
   transmitting the packet from at least one port of the network device based, at least in part, on one or more of the determined ingress and egress policies which can further be dynamically refined based on additional network information besides the source address block information.

2. The method of claim 1 wherein the address block information is obtained from an OUI field of a MAC address.

3. The method of claim 1 wherein the address block information is an Individual Address Block (IAB) that defines 4,096 addresses.

4. The method of claim 1 wherein the address block information at least partially defines the type of attached function.

5. The method of claim 1 further comprising:
   acquiring additional policy information; and
   revising the one or more policies based, at least in part, on the additional policy information.

6. The method of claim 5 wherein acquiring additional policy information includes:
   dynamically creating policy information.

7. The method of claim 5 wherein acquiring additional policy information includes:
   querying the attached function for policy information.

8. The method of claim 5 wherein acquiring additional policy information includes:
   querying a network infrastructure for policy information.

9. The method of claim 5 further comprising:
   monitoring network traffic to obtaining network traffic information; and
   revising the one or more policies based, at least in part, on the network traffic information.

10. The method of claim 5 wherein the additional policy information includes one or more of:
    attached function location information; attached function configuration information; attached function operating system information; attached function security features information; user location information; network entry port information, an address block; a user ID; a device type; a device location; an access device; an access location; a port type; a port speed; a number of users per port; a time of access; an application priority; an Ethernet protocol; a level of trust; a virus scan level; an operating system type; an operating system version; a change in network address; a time out event; a link change; a user initiated change; one or more devices changes; a device addition; a network service change; an access device change; an application access request; a protocol change; an additional wireless user; a bandwidth change; a routing link cost change; an RMON Event; a local dynamic policy change; and a remote dynamic policy change.

11. A computer program product embodied on a non-transitory computer readable storage medium having a plurality of instructions stored thereon that, when executed by a processor, cause the processor to perform operations comprising:
    receiving a packet, by a network device, from an attached function that initiates network access on a distributed computing network, wherein the packet is received without errors with a valid source address in a source address field;

acquiring source address block information from at least an OUI (Organization Unique Identifier) field of a MAC address or an IAB (Individual Address Block) address block for the attached function from the received packet, wherein the source address block information represents a subset of a total addressing capability;

in response to acquiring the source address block information, obtaining stored policy information based, at least in part, on the source address block information;

determining one or more policies based, at least in part, on the source address block information, wherein the one or more policies include one or more of an ingress and an egress policy, wherein the source address block information is used as a starting point in defining restrictive policies to securely protect network devices;

setting, by the network device, the one or more determined policies; and transmitting the packet from at least one port of the network device based, at least in part, on one or more of the determined ingress and egress policies which can further be dynamically refined based on additional network information besides the source address block information.

12. The computer program product of claim 11 wherein the address block information is obtained from an OUI field of a MAC address.

13. The computer program product of claim 11 wherein the address block information is an Individual Address Block (IAB) that defines 4,096 addresses.

14. The computer program product of claim 11 wherein the address block information at least partially defines the type of attached function.

15. The computer program product of claim 11 further comprising instructions for:
acquiring additional policy information; and
revising the one or more policies based, at least in part, on the additional policy information.

16. The computer program product of claim 15 wherein the instructions for acquiring additional policy information include instructions for:
dynamically creating policy information.

17. The computer program product of claim 15 wherein the instructions for acquiring additional policy information include instructions for:
querying the attached function for policy information.

18. The computer program product of claim 15 wherein the instructions for acquiring additional policy information include instructions for:
querying a network infrastructure for policy information.

19. The computer program product of claim 15 further comprising instructions for:
monitoring network traffic to obtaining network traffic information; and
revising the one or more policies based, at least in part, on the network traffic information.

20. The computer program product of claim 15 wherein the additional policy information includes one or more of:
attached function location information; attached function configuration information; attached function operating system information; attached function security features information; user location information; network entry port information, an address block; a user ID; a device type; a device location; an access device; an access location; a port type; a port speed; a number of users per port; a time of access; an application priority; an Ethernet protocol; a level of trust; a virus scan level; an operating system type; an operating system version; a change in network address; a time out event; a link change; a user initiated change; one or more devices changes; a device addition; a network service change; an access device change; an application access request; a protocol change; an additional wireless user; a bandwidth change; a routing link cost change; an RMON Event; a local dynamic policy change; and a remote dynamic policy change.

21. A system configured to perform operations comprising:
receiving a packet, by a network device, from an attached function that initiates network access on a distributed computing network, wherein the packet is received without errors with a valid source address in a source address field;

acquiring source address block information from at least an OUI (Organization Unique Identifier) field of a MAC address or an IAB (Individual Address Block) address block for the attached function from the received packet, wherein the source address block information represents a subset of a total addressing capability;

in response to acquiring the source address block information, obtaining stored policy information based, at least in part, on the source address block information;

determining one or more policies based, at least in part, on the source address block information, wherein the one or more policies include one or more of an ingress and an egress policy, wherein the source address block information is used as a starting point in defining restrictive policies to securely protect network devices;

setting, by the network device, the one or more determined policies; and transmitting the packet from at least one port of the network device based, at least in part, on one or more of the determined ingress and egress policies which can further be dynamically refined based on additional network information besides the source address block information.

22. The system of claim 21 wherein the address block information is obtained from an OUI field of a MAC address.

23. The system of claim 21 wherein the address block information is an Individual Address Block (IAB) that defines 4,096 addresses.

24. The system of claim 21 wherein the address block information at least partially defines the type of attached function.

25. The system of claim 21, wherein the system is further configured to perform operations comprising:
acquiring additional policy information; and
revising the one or more policies based, at least in part, on the additional policy information.

26. The system of claim 25 wherein acquiring additional policy information includes:
dynamically creating policy information.

27. The system of claim 25 wherein acquiring additional policy information includes:
querying the attached function for policy information.

28. The system of claim 25 wherein acquiring additional policy information includes:
querying a network infrastructure for policy information.

29. The system of claim 25, wherein the system is further configured to perform operations comprising:
monitoring network traffic to obtaining network traffic information; and
revising the one or more policies based, at least in part, on the network traffic information.

30. The system of claim 25 wherein the additional policy information includes one or more of:

attached function location information; attached function configuration information; attached function operating system information; attached function security features information; user location information; network entry port information, an address block; a user ID; a device type; a device location; an access device; an access location; a port type; a port speed; a number of users per port; a time of access; an application priority; an Ethernet protocol; a level of trust; a virus scan level; an operating system type; an operating system version; a change in network address; a time out event; a link change; a user initiated change; one or more devices changes; a device addition; a network service change; an access device change; an application access request; a protocol change; an additional wireless user; a bandwidth change; a routing link cost change; an RMON Event; a local dynamic policy change; and a remote dynamic policy change.

* * * * *